(12) United States Patent
Glossner et al.

(10) Patent No.: US 9,558,000 B2
(45) Date of Patent: Jan. 31, 2017

(54) MULTITHREADING USING AN ORDERED LIST OF HARDWARE CONTEXTS

(71) Applicant: Optimum Semiconductor Technologies, Inc., Tarrytown, NY (US)

(72) Inventors: C. John Glossner, Nashua, NH (US); Gary J. Nacer, Morris Plains, NJ (US); Murugappan Senthilvelan, Carmel, NY (US); Vitaly Kalashnikov, Norwalk, CT (US); Arthur J. Hoane, Yonkers, NY (US); Paul D'Arcy, Chelmsford, MA (US); Sabin D. Iancu, Pleasantville, NY (US); Shenghong Wang, Yorktown Heights, NY (US)

(73) Assignee: Optimum Semiconductor Technologies, Inc., Tarrytown, NY (US)

( * ) Notice: Subject to any disclaimer, the term of this patent is extended or adjusted under 35 U.S.C. 154(b) by 233 days.

(21) Appl. No.: 14/539,342

(22) Filed: Nov. 12, 2014

(65) Prior Publication Data
US 2015/0220347 A1  Aug. 6, 2015

Related U.S. Application Data

(60) Provisional application No. 62/013,241, filed on Jun. 17, 2014, provisional application No. 61/936,428, filed on Feb. 6, 2014.

(51) Int. Cl.
*G06F 9/30* (2006.01)
*G06F 9/38* (2006.01)
*G06F 9/46* (2006.01)

(52) U.S. Cl.
CPC ........... *G06F 9/3851* (2013.01); *G06F 9/3836* (2013.01); *G06F 9/3838* (2013.01); *G06F 9/3853* (2013.01); *G06F 9/3885* (2013.01); *G06F 9/46* (2013.01)

(58) Field of Classification Search
CPC ..... G06F 9/3836; G06F 9/3838; G06F 9/3851
See application file for complete search history.

(56) References Cited

U.S. PATENT DOCUMENTS

| 5,303,356 A | 4/1994 | Vassiliadis et al. |
| 5,392,393 A | 2/1995 | Deering |

(Continued)

FOREIGN PATENT DOCUMENTS

| EP | 1555610 | 7/2005 |
| WO | WO0146827 | 6/2001 |

(Continued)

OTHER PUBLICATIONS

EP Search Report dated Apr. 29, 2015—6 pages.

(Continued)

*Primary Examiner* — Corey S Faherty
(74) *Attorney, Agent, or Firm* — Lowenstein Sandler LLP; Jialin Zhong, Esq.

(57) ABSTRACT

A processing device identifies a set of software threads having instructions waiting to issue. For each software thread in the set of the software threads, the processing device binds the software thread to an available hardware context in a set of hardware contexts and stores an identifier of the available hardware context bound to the software thread to a next available entry in an ordered list. The processing device reads an identifier stored in an entry of the ordered list. Responsive to an instruction associated with the identifier having no dependencies with any other instructions among the instructions waiting to issue, the processing device issues the instruction waiting to issue to the hardware context associated with the identifier.

24 Claims, 19 Drawing Sheets

(56) References Cited

U.S. PATENT DOCUMENTS

| | | | |
|---|---|---|---|
| 5,500,942 A * | 3/1996 | Eickemeyer | G06F 9/30149 712/210 |
| 5,974,534 A * | 10/1999 | Noordeen | G06F 9/3802 712/213 |
| 6,047,323 A * | 4/2000 | Krause | G06F 9/4426 709/201 |
| 6,138,230 A | 10/2000 | Hervin et al. | |
| 6,260,189 B1 | 7/2001 | Batten et al. | |
| 6,842,848 B2 | 1/2005 | Hokenek et al. | |
| 6,928,645 B2 | 8/2005 | Wang et al. | |
| 7,543,132 B1 | 6/2009 | Grohoski et al. | |
| 7,676,660 B2 | 3/2010 | Kissell | |
| 7,725,697 B2 * | 5/2010 | Kissell | G06F 9/30043 712/244 |
| 7,861,061 B2 * | 12/2010 | Hussain | G06F 9/3853 712/215 |
| 8,230,430 B2 | 7/2012 | Accapadi et al. | |
| 8,499,299 B1 | 7/2013 | Jakab et al. | |
| 8,612,986 B2 | 12/2013 | Accapadi et al. | |
| 2002/0091915 A1 | 7/2002 | Parady | |
| 2002/0144083 A1 | 10/2002 | Wang et al. | |
| 2004/0054880 A1 | 3/2004 | Bernstein et al. | |
| 2004/0073781 A1 | 4/2004 | Hokenek | |
| 2006/0095729 A1 | 5/2006 | Hokenek et al. | |
| 2006/0130062 A1 | 6/2006 | Burdick et al. | |
| 2007/0076479 A1 | 4/2007 | Kim et al. | |
| 2008/0126766 A1 | 5/2008 | Chheda et al. | |
| 2013/0241595 A1 | 9/2013 | Kelem et al. | |

FOREIGN PATENT DOCUMENTS

| | | |
|---|---|---|
| WO | WO2009022294 | 2/2009 |
| WO | WO2013071874 | 11/2011 |

OTHER PUBLICATIONS

PCT Search Report for PCT/US2015/014272 Dated May 11, 2015, 2 pages.

PCT Search report for PCT/US2015/014064 Dated May 11, 2015, 2 pages.

PCT Search report for PCT/US2015/014270 Dated May 14, 2015, 2 pages.

M. Moudgill, J. Glossner, S. Agrawal, and G. Nacer, "The Sandblaster 2.0 Architecture and SB3500 Implementation," in Proceedings of the Software Defined Radio Technical Forum (SDR Forum '08), Washington DC, Oct. 2008.

Organization of Computer Systems: Processor & Datapath, pp. 1-24, Retrieved Sep. 29, 2015.

* cited by examiner

| Chaining bit combination i1, i2 | Semantics |
|---|---|
| 0,0 | Hazard with next instruction group. Wait for completion of current instruction group before issue.<br>Hazard within instruction group. Issue instructions serially and wait for completion before next instruction issue. |
| 0,1 | No hazard with next instruction group. Issue vertically and propagate chain.<br>Hazard within instruction group. Issue instructions serially and wait for completion before next instruction issue. |
| 1,0 | Hazard with next instruction group. Wait for completion of current instruction group before issue.<br>No hazard within instruction group. Issue instructions horizontally and propagate chain. |
| 1,1 | No hazard with next instruction group. Issue vertically and propagate chain.<br>No hazard within instruction group. Issue instructions horizontally and propagate chain. |

FIGURE 12

| Chaining bit combination i1, i2, i3 | Semantics |
|---|---|
| x,x,0 | Irrespective of bits i1, and i2, if i3 is 0, it indicates a hazard with next instruction group. Wait for completion of current instruction group before issue. |
| x,x,1 | Irrespective of bits i1, and i2, if i3 is 0, it indicates no hazard with next instruction group. Issue vertically and propagate chain. |
| 0,0,x | Hazard between instruction 1 and 2 in instruction group. Issue them serially.<br>Hazard between instruction 2 and 3 in instruction group. Issue them serially. |
| 0,1,x | Hazard between instruction 1 and 2 in instruction group. Issue them serially.<br>No hazard between instruction 2 and 3 in instruction group. Issue instructions in parallel and propagate chain. |
| 1,0,x | No hazard between instruction 1 and 2 in instruction group. Issue instructions in parallel and propagate chain.<br>Hazard between instruction 2 and 3 in instruction group. Issue them serially. |
| 1,1,x | No hazard between instruction 1 and 2 in instruction group. Issue instructions in parallel and propagate chain.<br>No hazard between instruction 2 and 3 in instruction group. Issue instructions in parallel and propagate chain. |

FIGURE 13

| Chaining bit combination i1, i2, i3, i4 | Semantic |
|---|---|
| x,x,x,0 | Irrespective of bits i1, i2, and i3, if i4 is 0, it indicates a hazard with next instruction group. Wait for completion of current instruction group before issue. |
| x,x,x,1 | Irrespective of bits i1, i2, and i3, if i4 is 0, it indicates no hazard with next instruction group. Issue vertically and propagate chain. |
| 0,0,0,x | Hazard between all instructions in the instruction group. Issue all instructions serially. |
| 0,0,1,x | Hazard between instructions 2 and 3 in instruction group. Can issue instructions 1 and 2 in parallel and instructions 3 and 4 in parallel. |
| 0,1,0,x | Hazard between instructions 1 and 2 in instruction group. Have to issue instruction 1 separately. Can issue instructions 2, 3 and 4 in parallel. |
| 0,1,1,x | Hazard between instructions 3 and 4 in instruction group. Can issue instructions 1, 2 and 3 in parallel. Have to issue instruction 4 separately. |
| 1,0,0,x | No hazards between all instructions in the instruction group. Can issue all instructions in parallel. |
| 1,0,1,x | Have to issue instruction 1 separately. Must issue instructions 2, 3, and 4 in parallel. |
| 1,1,0,x | Must issue instructions 1, 2, and 3 in parallel. Have to issue instruction 4 separately. |
| 1,1,1,x | Must issue all instructions in the instruction group in parallel. |

FIGURE 14

MULTITHREADING USING AN ORDERED LIST OF HARDWARE CONTEXTS

CROSS-REFERENCE TO RELATED APPLICATIONS

This application claims the benefit of U.S. provisional patent application 62/013,241 filed Jun. 17, 2014, and U.S. provisional patent application No. 61/936,428 filed Feb. 6, 2014 (hereinafter "the '428 application"), the disclosures of which are incorporated herein by reference in their entirety.

TECHNICAL FIELD

Examples of the present disclosure relate to computer architecture. More particularly, the examples relate to a multi-threaded instruction set architecture and organization that is capable of executing RISC-based control code and digital signal processor (DSP) code.

BACKGROUND

Multi-threaded parallel processing technologies have been employed in high-performance processors to reduce the impact of high-speed processor instruction execution latency caused by long pipelines. Multi-threaded parallel processing technologies have improved instruction per cycle performance and efficiency over other processor designs. Multithreading is a well-known technique for both hardware and software acceleration. The Delencor HEP processor was designed by Bruton Smith circa 1979 (see "www-ee.eng.hawaii.edu/~nava/HEP/introduction.html" for more details). In this design, multiple instructions may be executed from a single thread. One requirement of the design of the Delencor HEP processor was that each software thread had to complete the current instruction prior to issuing a subsequent instruction. When each hardware thread unit (hereinafter "a context" or "hardware context" to distinguish it from a software thread) issues an instruction and progresses in sequence, it may be termed barrel multi-threading or round robin scheduling.

In a multithreaded processor, all threads of execution operate simultaneously. In barrel multithreading, each hardware thread unit or context may be permitted to execute an instruction simultaneously but only one context may issue an instruction on a cycle boundary. Therefore, if there are C contexts, C cycles are required to issue an instruction from all contexts. All contexts execute simultaneously but only one context may issue instructions on a particular clock cycle. Each clock cycle, the contexts issue instructions and the thread that executes are implied to be permitted to execute by incrementing the context number.

FIG. 1 shows an example of a barrel multithreading execution sequence. In this example, a processor dispatches threads to contexts one instruction per clock cycle in the specific order of T0->T1->T2->T3->T4->T5->T6->T7->T0 . . . , going all the way around the chain until completing the circle and arriving again at T0. In a processor with 8 contexts, 8 clock cycles are required to dispatch a thread to all 8 contexts. Further, a single context (e.g. T0) may only issue an instruction once every 8 clock cycles.

FIG. 2 shows an example of execution of two instructions in a non-pipelined processor. To execute the two instructions addi and muli, each instruction progresses through four stages of operation. "addi" represents add immediate where the register r2 is added with the immediate value 8 and the result is stored in register r0. "muli" represents multiply immediate where register r3 is multiplied with the immediate value 4 and the result is stored in register r8. In the first stage, instruction fetch (IF), the instruction addi is fetched from memory and decoded. In the second stage, register read (RD), the operand r2 is read from a register file. In the third stage, execute (Ex), the operand from register r2 is added with the immediate value 8. In the fourth stage, write back (WB), the result is written into register r0. After the result is written, the next instruction (muli) is fetched. Thus, to execute N instructions, 4N clock ticks are required.

Pipelining is a technique that overlaps execution of multiple instruction by noting that, when an instruction leaves a particular stage of execution, that stage is dormant and if another instruction is available to execute, the latter instruction can begin execution prior to the completion of the previous instruction. FIG. 3 shows an example of pipelined overlapped execution. In a perfectly pipelined machine without hazards, rather than requiring 4N clock cycles to execute N instructions, perfect pipelining reduces the clock cycles to N+3.

However, pipelining may not be without hazards. FIG. 4 shows an example where the result of addi is required by the muli instruction. If the instruction is permitted to execute as shown in Error! Reference source not found., an incorrect result would be returned because the result is not placed into r0 until after the muli instruction reads r0. This is known as a read after write (RAW) hazard. To avoid this hazard, the pipeline must be interlocked and thus stall, creating what are known as pipeline bubbles. Pipeline interlocking may introduce non-determinism into the system. If N instructions have no hazards, then the execution time is N+3 clock cycles. If every instruction has a hazard then the execution time is 3N+1 cycles. A typical program P will be bounded by N+3<=P<=3N+1.

FIG. 5 shows an example of an execution sequence of a set of instructions in a barrel-threaded pipelined processor. In this example, three independent threads are executing on a pipelined processor that shares execution units. A first thread executes the original addi/muli instruction sequence 502, 504. In the absence of interrupts or long latency loads, there are never any pipeline interlocks because instructions 506, 508 from a second thread and a third thread, respectively, are inserted into the pipeline. Thus, the first thread does not encounter any hazards. In this example, N instructions will always complete in N+3 cycles without any hazards. However, those N instructions must be distributed across a sufficient number of threads to guarantee hazard-free execution. A drawback is that if only a single thread is present in the system, the single thread it will always require 3N+1 cycles to execute the program even if the instructions are hazard free.

A number of techniques have been developed in order to improve the performance of single threaded programs executing on multithreaded processors. One such technique is simultaneous multithreading (SMT) employed in a processor (see "www.cs washington.edu/research/smt/index.html" for more details). SMT has been employed in Intel's Hyper-Threading as described in "Intel Hyper-Threading Technology, Technical User's Guide," IBM's POWER5 as described in Clabes, Joachim et al. "Design and Implementation of POWER5 Microprocessor," Proceedings of 2004 IEEE International Solid-State Circuits Conference," Sun Microsystems's Ultra SPARC T2 as described in "Using the Cryptographic Accelerators in the UltraSPARC T1 and T2 Processors," *Sun BluePrints Online*, Sun Microsystems, retrieved 2008-01-09, and the MIPS MT as described in "MIPS32 Architecture," Imagination Technologies, Retrieved 4 Jan. 2014.

Typical SMT-based processors have required each thread to have own set of registers and additional tracking logic at every stage of a pipeline within the SMT-based processor. This increases the size of hardware resources, specifically thread tracking logic needed to implement the design of the SMT-based processor. The thread tracking logic employed by the SMT-based processor is not only required to trace the execution of a thread but also is required to determine whether the thread has completed execution. Because the SMT-based processor may employ a large number of actively executing hardware contexts, the size of CPU caches and associated translation look-aside buffers (TLB) need to be large enough to avoid hardware context thrashing.

Although SMT technology may improve single-threaded performance, the above-identified control circuit complexity renders it difficult to apply SMT technology to embedded processors that require low-power consumption.

With simultaneous multithreading, multiple hardware thread units (hardware contexts) may issue multiple instructions each cycle. When combined with superscalar techniques such as out-of-order processing, the additional hardware required for SMT is not significant. However, care must be taken in the thread dispatch to ensure that all threads may issue instructions. To facilitate this, various techniques have been developed, including priority inversion and pre-emptive scheduling.

An advantage of simultaneous multithreading is that a single thread may issue instructions to the pipeline every clock cycle. Thus, a program P with only a single thread may execute in the N+3 cycles on a 4-stage pipeline in the absence of hazards. In reality, SMT's are almost always implemented with superscalar issue logic so that the number of required clock cycles are even further reduced by N+3/IPC (instructions per cycle). A key consideration of SMT processors is that execution time is no longer deterministic. However, single threaded performance is significantly enhanced at the expense of additional complex hardware.

To overcome SMT control circuit complexity and reduce power consumption, other forms of multi-threading technologies have been developed. Block multi-threading and interleaved multithreading have been proposed. Unfortunately, block multi-threading technology has been restricted to microcontrollers and other low-performance processors. Conventional interleaved multi-threading technology, also known as token-triggered multi-threading, has simplified control circuitry but performance suffers when there are fewer software threads than available hardware contexts in the processor. This technology been promoted in certain high-performance low-power processors. A representative example of token-triggered multi-threading technology is described in U.S. Pat. No. 6,842,848.

Conventional token-triggered multi-threading employs time sharing. Each software thread of execution is granted permission by the processor to executed in accordance with its own assigned clock cycles. Only one software thread per clock cycle is permitted to issue commands. A token is employed to inform a software thread as to whether the software thread should issue an instruction in the next clock cycle. This further simplifies hardware context logic. No software thread may issue a second instruction until all software threads have issued an instruction, if a software thread has no instruction available to issue, a no operation (NOP) is issued by the hardware context. Processor hardware ensures that each software thread has the same instruction execution time. The result of an operation may be completed within a specified guarantee period of time (e.g., clock cycles). Accordingly, no instruction execution related inspection and bypass hardware is needed in the processor design.

Conventional token-trigger multi-threading technology simplifies the hardware issue logic of a multi-threaded processor and, accordingly, may achieve high performance with very little power consumption. However, compared with SMT technologies, the performance improvement of a conventional token-trigger multi-threading processor is limited if there are fewer software threads having executable instructions during a clock cycle than available hardware contexts. In such circumstances, hard contexts that do not have software threads assigned to them must issue NOPs.

In order to avoid interference between software threads and to simplify the hardware structure, conventional token triggered multithreading employs a time sharing strategy that can cause a small number of instructions to be executed per cycle. This reduces the processing speed of a single-threaded operation. For example, if the software instruction for context $T_1$ is not in the cache and requires a reload from external memory, due to the slow speed of the external memory, $T_1$ has to wait for many cycles to reload instructions. If context $T_0$ has an instruction ready, it still must wait to issue the instruction at clock cycle $C_1$. However, because of the structural limitations of the time shared data path, clock cycle $C_1$ can only be used by context $T_1$ and in this case the hardware context must issue a NOP.

In the worst case of a single software thread of execution, the performance of a corresponding conventional token-triggered processor is 1/T (where T is the number hardware contexts). In a 10-threaded token-triggered processor running at 1 GHz, the performance of the processor is effectively reduced to 100 MHz.

To avoid thrashing and simplify the tracking circuits between hardware context threads, in the Sandblaster 2.0 processor, each hardware context has its own separate instruction memory as described in "The Sandblaster 2.0 Architecture and SB3500 Implementation Proceedings of the Software Defined Radio Technical Forum (SDR Forum '08)," Washington, D.C., October 2008. Unfortunately, the individual instruction memories cannot be shared between hardware contexts. This may result in underutilized memory resources in addition to reduced performance when the number of software threads is fewer than the number of hardware contexts.

SUMMARY

The above-described problems are addressed and a technical solution is achieved in the art by providing a processing device that minimizes unused clock cycles in the multithreaded processor when there are fewer software threads than hardware thread units. The processing device identifies a set of software threads having instructions waiting to issue. For each software thread in the set of the software threads, the processing device binds the software thread to an available hardware context in a set of hardware contexts and stores an identifier of the available hardware context bound to the software thread to a next available entry in an ordered list. The processing device reads an identifier stored in an entry of the ordered list. Responsive to an instruction associated with the identifier having no dependencies with any other instructions among the instructions waiting to issue, the processing device issues the instruction waiting to issue to the hardware context associated with the identifier.

In an example, the processing device may further iterate said reading an identifier and said issuing the instruction for the next entry in the ordered list in the next clock cycle until all entries in the list have been visited. In an example, the processing device may further repeat said iterating until one or more of the software threads having instructions waiting to issue are terminated.

In an example, responsive to the termination of a software thread from the software threads having instructions waiting to issue, the processing device may remove the corresponding identifier from the ordered list and unbind the terminated software thread from the corresponding available hardware context in a set of hardware contexts.

In an example, responsive to the addition of a new software thread to the software threads having instructions waiting to issue, the processing device may bind the new software thread to an available hardware context in a set of hardware contexts and store an identifier of the available hardware context bound to the new software thread to a next available entry in an ordered list.

In an example, responsive to an instruction associated with the identifier having one or more dependencies with any other instructions among the instructions waiting to issue, the processing device may issue a no-operation for the associated software thread or may register bypass the result directly to the next instruction.

In an example, the ordered list may be an array of bits and the identifier stored in the ordered list is a bit set corresponding to a context number in the set of hardware contexts. In an example, the ordered list may be an array of labels and the identifier stored in the ordered list is a label corresponding to a context number in the set of hardware contexts. In an example, the ordered list may be a linked-list of labels and the identifier stored in the ordered list is a label corresponding to a context number in the set of hardware contexts.

In an example, dependencies are identified in view of the values of a chaining bit extracted from each of the instructions waiting to issue.

In an example, to determine that the instruction associated with the identifier has no dependencies with any other instructions among the instructions waiting to issue may comprise the processing device may group the instruction associated with the identifier and the other instructions among the instructions waiting to issue into a group of instructions. The processing device may extract a designated bit from each instruction of the group of instructions to produce a sequence of chaining bits. The processing device may decode the sequence of chaining bits. The processing device may identify zero or more instruction dependencies among the group of instructions in view of the decoded sequence of chaining bits. The processing device may determine that the instruction associated with the identifier is associated with zero dependencies of the zero or more instruction stream dependencies.

In an example, the sequence of chaining bits may be decoded without decoding any of the instructions in the group of instructions. In an example, an identified dependency between two or more instructions within the group of instructions may be a control dependency or a data dependency.

In an example, the processing device may encode the designated bit in each instruction with the zero or more dependencies among the group of instructions to produce a sequence of chaining bits.

BRIEF DESCRIPTION OF THE DRAWINGS

The present invention may be more readily understood from the detailed description of examples presented below considered in conjunction with the attached drawings and in which like reference numerals refer to similar elements.

FIG. 12 shows one example of a set of instruction chaining semantics for a dual-issue pipelined processor.

FIG. 13 shows one example of semantics for instruction chaining in a 3-issue processor.

FIG. 14 shows one example of a set of instruction chaining semantics for a 4-issue processor.

It is to be understood that the attached drawings are for purposes of illustrating the concepts of the invention and may not be to scale.

DETAILED DESCRIPTION

Examples of the present disclosure relate to the field of computer architecture. More particularly, the examples relate to a multi-threaded instruction set architecture and organization that is capable of executing RISC-based control code and digital signal processor (DSP) code. Examples include a unique combination of modern techniques including a SIMD vector unit, and chained instruction execution.

Typical designs of multi-threaded processors have shown that multi-threaded processors may issue instructions from hardware thread units (called contexts or hardware contexts to distinguish them from software threads) in a variety of ways. One way of issuing instructions is to traverse sequentially through a number of contexts. Using a specialized pipeline design in conjunction with multithreading, it is possible to ensure contexts do not conflict with respect to requesting and using processor resources while scheduling the next context to execute.

One problem with typical designs of multi-threaded processors is that single threaded performance may suffer. In examples of the present disclosure, a barrel-threaded processor is guaranteed a dispatch slot providing deterministic behavior. Other threads may also dispatch to a context using a specific dispatch policy that provides enhanced single threaded performance in a deterministic manner without causing dead-lock.

Figure 6:
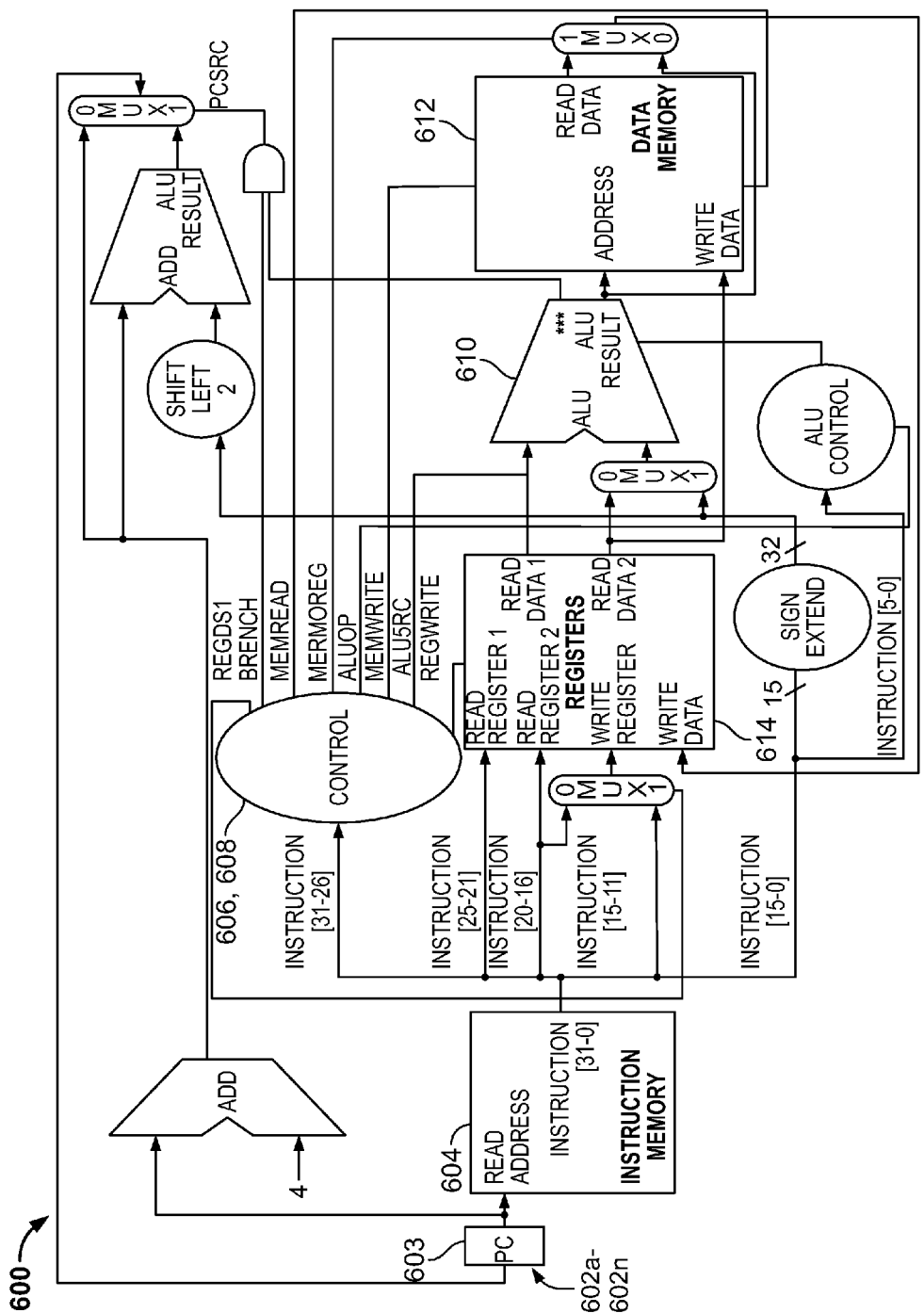
FIG. 6 shows one example of a hardware thread unit within a multithreaded processor that minimizes unused clock cycles when there are fewer executable software threads than available hardware thread units, in which examples of the present disclosure may operate.

FIG. 6 shows one example of a hardware thread unit of a multithreaded processor 600 that minimizes unused clock cycles when there are fewer executable software threads than available hardware thread units, in which examples of the present disclosure may operate. In an example, the multithreaded processor 600 may comprise a plurality of hardware thread units 602a-602n. Each of the hardware thread units 602a-602n may comprise a program counter (PC) 603, an instruction memory 604, an instruction decoder 606, one or more pipeline execution units comprising arithmetic logic units (ALUs) 610, a data memory 612, and a register file 614.

In one example, "groups" of instructions may be read from the instruction memory (I-Cache) 604 and decoded by the instruction decoder 606, respectively. The decoded information may be employed to generate control signals (labeled "control" or "instruction issue logic 608" shared by the plurality of hardware thread units 602a-602n) that control the operations of data path and pipelines. Direct register references may be transmitted to a register file 614 (labeled RF) and data contained within the register file 614 may be transmitted to the one or more pipeline execution units execution units comprising arithmetic logic units (ALUs) 610. The results of an operation, stored in the data memory 612, may be written back to the register file 614. The program counter (PC) 603 may be updated and the next instruction may be fetched from the instruction memory 604.

It will be appreciated by those skilled in the art that, in one example, one or more of the elements 603-614 of the multithreaded processor 600 may be shared across the hardware thread units 602a-602n. For example, one or more of the element 603-614 (e.g., the one or more arithmetic logic units (ALUs) 610, the instruction memory (I-Cache) 604, the data memory 612, etc.) may be shared amongst the hardware thread units 602a-602n when the one of more of the elements 603-614 do not represent processor state. Conversely, in an example, any of the elements 603-614 that represents processor state need to be replicated for each of the hardware thread units 602a-602n.

Figure 7:
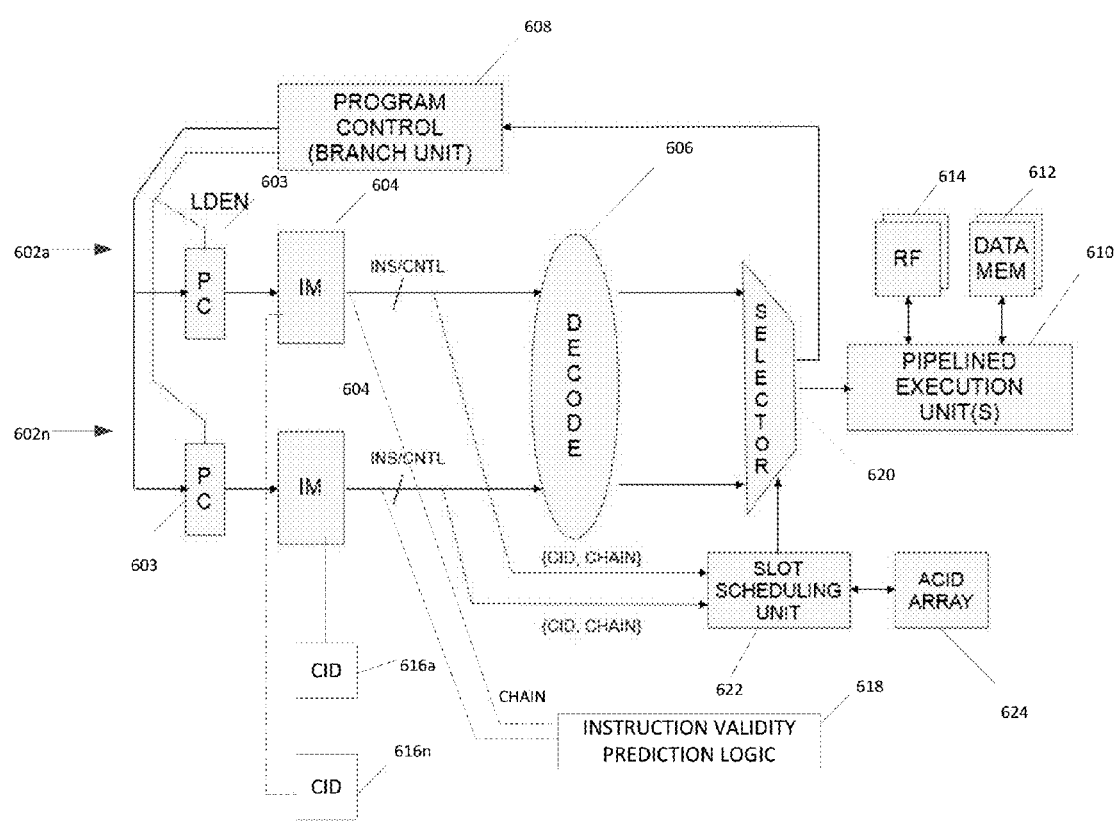
FIG. 7 shows a block diagram of one example of the hardware thread unit within the multithreaded processor of FIG. 6 expanded to show components of the instruction issue logic shared by the plurality of hardware thread units to control signal generation for instruction issue.

FIG. 7 shows a block diagram of one example of the hardware thread unit within the multithreaded processor 600 of FIG. 6 expanded to show components of the instruction issue logic 608 shared by the plurality of hardware thread units 602a-602n to control signal generation for instruction issue. In an example, in addition to the components described above in FIG. 6, the multithreaded processor 600 may be further provided with a set of context ID (CID) registers 616a-616n associated with corresponding ones of the hardware contexts (e.g., 602a-602n), instruction validity prediction logic 618, a selector 620, a slot scheduling unit 622, and an allocated context ID array (ACID) register 624 to keep track of how many hardware contexts (e.g., 602a-602n) are actively executing software threads. The slot scheduling unit 622 of the instruction issue logic 608 employs identifiers provided by the context ID (CID) registers 616a-616n and "chaining bits" provided by instruction validity prediction logic 618 (CID, CHAIN, respectively) to determine whether an instruction may issue as selected by the selector 620. If all hardware contexts (e.g., 602a-602n) have software threads assigned to them, then execution proceeds in round robin fashion as would be the case with any barrel-threaded processor. However, if there are fewer software threads than hardware contexts (e.g., 602a-602n), the slot scheduling unit 622 of the instruction issue logic 608 employs the ACID array register 624 to determine the round robin pattern.

Figure 3:
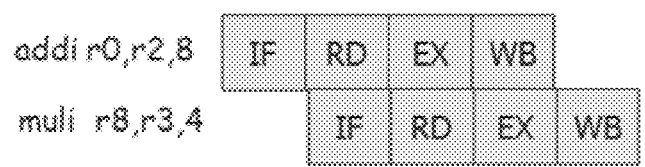
FIG. 3 shows an example of pipelined overlapped execution.
Figure 4:
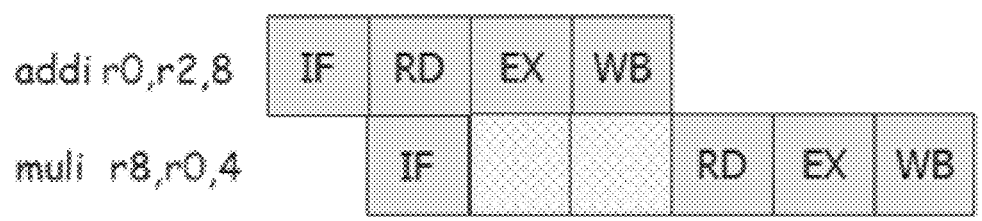
FIG. 4 shows an example where the result of addi is required by the muli instruction of FIG. 1.
Figure 8:
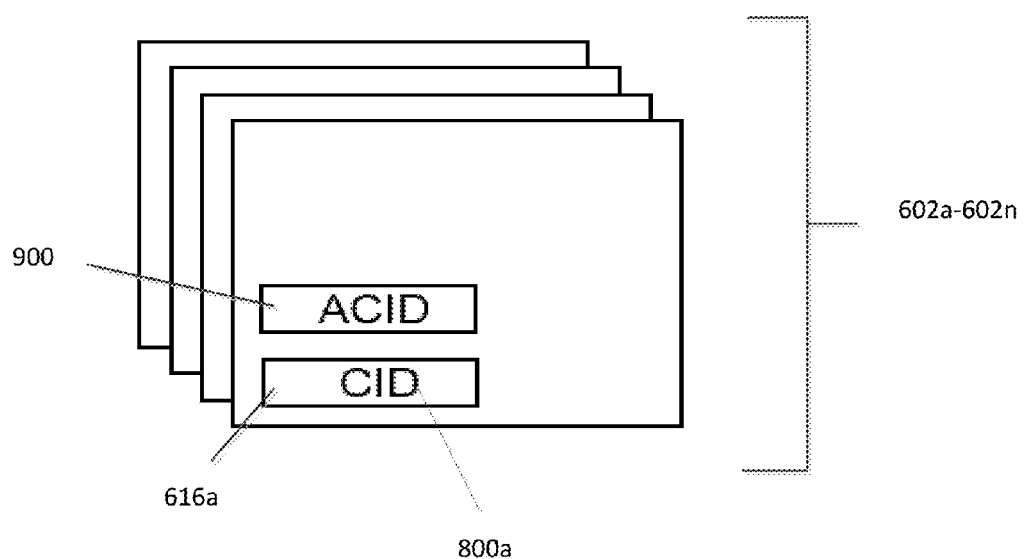
FIG. 8 shows an example of a set of hardware contexts that comprise a Context ID (CID) register.

In an example, a processor, computer processor, or processing device 600 (e.g., the multithreaded processor 600) may include one or more pipelines that may issue instructions each cycle. FIG. 3 is a representative example but those skilled in the art will recognize that modern processor pipelines may be twenty (20) stages or more and associated one or more hardware contexts (often termed a hardware thread unit, e.g., hardware thread units 602a-602n. Each hardware context (e.g., 602a-602n) may comprise a Context ID (CID) register (e.g., 616a) as shown in FIG. 8. A context identifier (e.g., CID 800a) stored in a corresponding context ID register (e.g., 616a) may be fixed to identify the current hardware context (e.g., 602a-602n) in which a software thread may execute. The CID (e.g., 800a) may be used to access the correct register file state and to dynamically bind a software thread to a hardware context (e.g., 602a-602n). In an example, for each hardware context in a set of hardware contexts (e.g., 602a-602n) associated with a processing device (e.g., the multithreaded processor 600), the processing device (e.g., the multithreaded processor 600) may assign a value of a CID (e.g., 800a) to the hardware context (e.g., 602a-602n) in corresponding ones of the context ID registers (e.g., 616a-616n).

Figure 9:
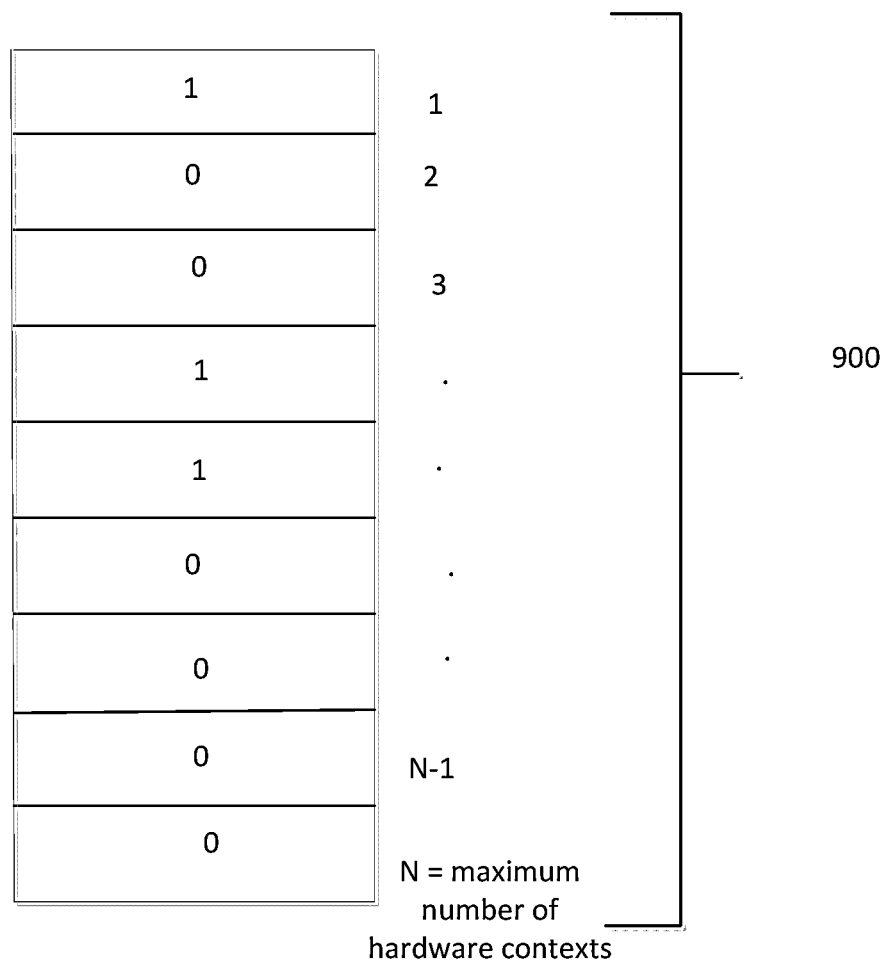
FIG. 9 shows an ordered list of identifiers configured to keep track of how many hardware contexts are actively executing software threads.

As shown in FIG. 9, an ordered list of identifiers, for example, an array of bits in an AllocatedContextIDArray ("ACID array") register 900, may be configured to keep track of how many hardware contexts (e.g., 602a-602n) are actively executing software threads. The ACID array register 900 may contain one bit for each hardware context (e.g., 602a-602n). A bit may be set corresponding to a hardware context number in the set of hardware contexts (e.g., 602a-602n).

At runtime, an operating system running on the processing device (e.g., the multithreaded processor 600) may bind a software thread to a hardware context (e.g., 602a-602n). In one example implementation, the hardware context to which the software thread is bound sets the ACID array bit location corresponding to the hardware context. At runtime, the processing device 600 (e.g., the multithreaded processor 600) may assign software threads to contexts in an incremental ordering to ensure that adjacent hardware contexts are allocated. In one example, assuming three hardware contexts, all of which have software threads assigned, the processing device 600 (e.g., the multithreaded processor 600) may issue instructions from software threads in the following manner: T0->T1->T2->T0, etc.

Figure 10:
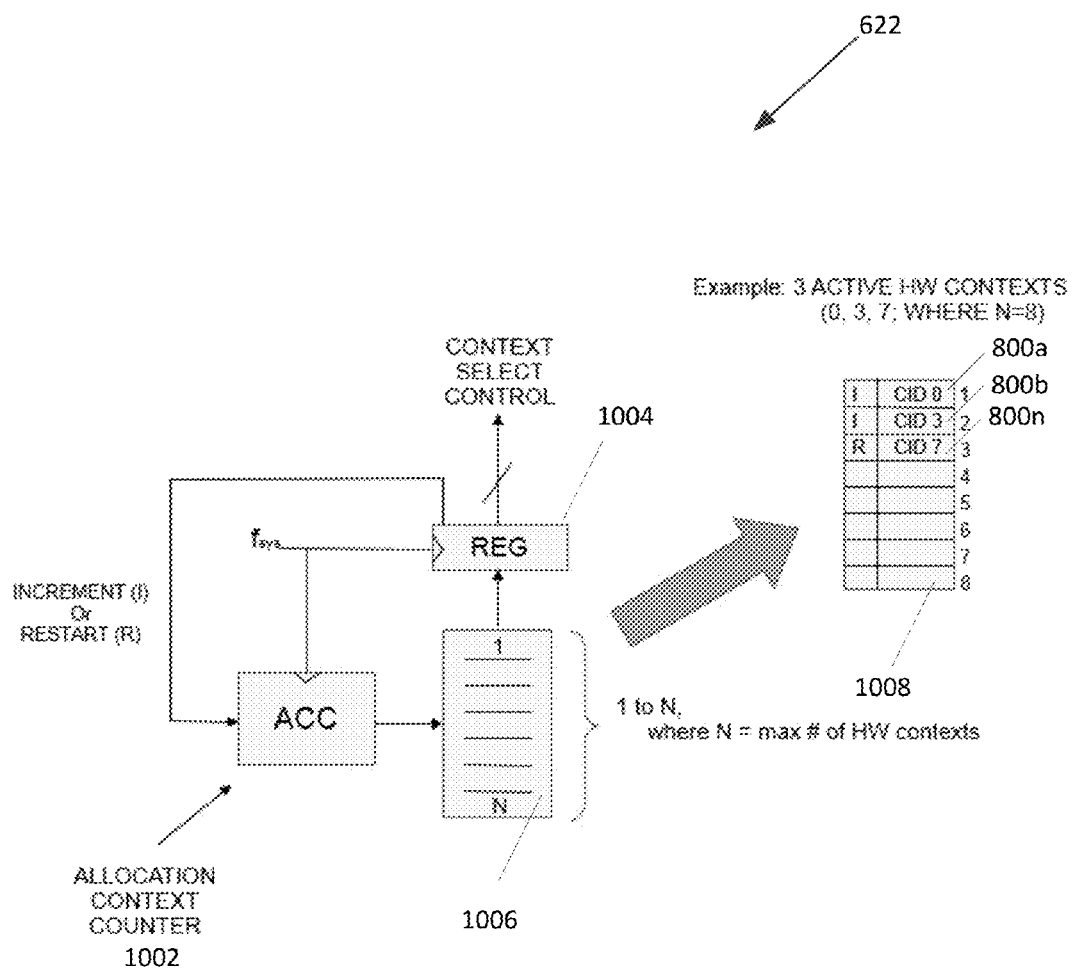
FIG. 10 shows one example of an implementation of the slot scheduling unit of FIG. 7, in which there are three (3) active hardware contexts.

FIG. 10 shows one example of an implementation of the slot scheduling unit 622 of FIG. 7, in which there are three (3) active hardware contexts. An allocation context counter (ACC) 1002 and a register 1004 are provided with a system clock signal $f_{sys}$. In this example, 3 entries of an ACID array 1006 are set (e.g., to "1"). These values/identifiers in the ACID array are fed into the register 1004 that controls clock generation to the hardware context issue. With three (3) allocated active hardware contexts, the processing device 600 (e.g., the multithreaded processor 600) may issue instructions from software threads T0->T1->T2->T0->T1->T2, etc. Notice that context T3, which has no active software thread, does not issue any instructions.

To one skilled in the art, it will be appreciated that other apparatuses may be used to keep track of the number of active hardware including, but not limited to, non-contiguous contexts that use a small table of active contexts comprising entries that comprise context identifier labels (e.g., CID 0, CID 3, CID7, etc.). The identifier labels may indicate the current hardware context from which to issue instructions. A corresponding flag may indicates the action that should be taken in the next clock cycle (e.g., to "I" for increment, "R" for repeat") that would be modified when a thread is started or stopped. A linked list of active contexts and other apparatus may also be used.

In one example, the ordered list 1008 of identifiers may be an array (e.g., the ACID array register 900) of labels (e.g., CIDs 800a-800n). An identifier stored in the ordered list 1008 may be a label (e.g., a CID 800a) corresponding to a context number in the set of hardware contexts (e.g., 602a-602n). Each of the labels (e.g. CIDs 800a-800n) in the ordered list 1008 (e.g., the ACID array register 900) may be non-repeating.

In another example, the ordered list 1008 (e.g., the ACID array register 900) may be a linked-list of labels (CIDs 800a-800n) and the identifier stored in the ordered list 1008 (e.g., the ACID array register 900) is a label (CID 800a) corresponding to a context number in the set of hardware contexts (e.g., 602a-602n).

Figure 5:
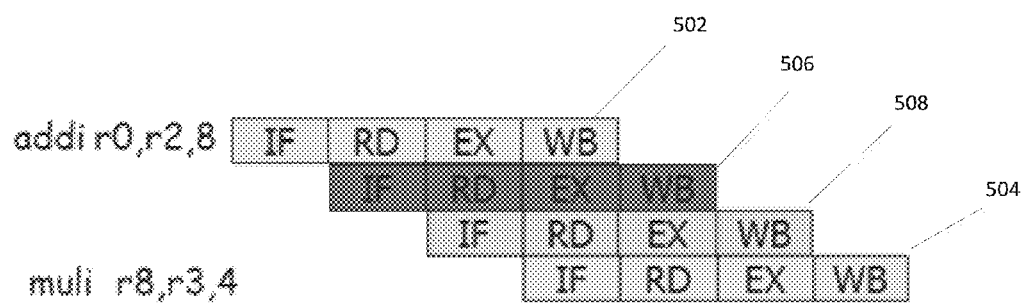
FIG. 5 shows an example of an execution sequence of a set of instructions in a barrel-threaded pipelined processor.

This "truncated" context instruction issue may introduce inter-instruction hazards in the pipeline. Whereas, as shown in FIG. 5, the context T0 (502) was originally guaranteed four clock cycles before a subsequent register file read (thus avoiding any hazard), now with the "truncated" thread issue, a true hazard arises in the pipeline. Instruction chaining may be employed to either register bypass the result directly to the next instruction or, when necessary, to stall the processor for an additional clock cycle to guarantee the correct result. Avoiding the hazard may also be accomplished with dynamic logic; however, dynamic logic tends to dissipate significant power.

Note that when all contexts are allocated, any additional logic required with truncated context scheduling may be disabled, thereby minimizing power dissipation.

If there is a single thread in the system and the chaining bits identify that subsequent instructions may issue, then the multithreaded barrel processor may obtain peak single threaded performance without the requirement of complex hazard detection circuitry.

Referring again to FIGS. 6-10, in one example, the instruction issue logic 608 of the processing device 600 (e.g., the multithreaded processor 600) may be configured to identify a set of software threads having instructions waiting to issue. For each software thread in the set of the software threads, the instruction issue logic 608 may be configured to bind the software thread to an available hardware context (e.g., 602a) in a set of hardware contexts (e.g., 602a-602n). For each software thread in the set of the software threads, the instruction issue logic 608 may be configured to store an identifier (e.g., a context identifier (CID) (e.g., 800a) of the available hardware context (e.g., 602a) bound to the software thread to a next available entry in an ordered list 1008 of identifiers (e.g., the ACID array register 900). In an example, the instruction issue logic 608 may be configured to read an identifier (e.g., a CID 800a) stored in an entry of the ordered list 1008 (e.g., the ACID array register 900). If an instruction associated with the identifier (e.g., a CID 800a) has no dependencies with any other instructions among the instructions waiting to issue, then the instruction issue logic 608 may be configured to issue the instruction waiting to issue to the hardware context (e.g., 602a) associated with the identifier (e.g., a CID 800a). The instruction issue logic 608 may be configured to iterate said reading an identifier (e.g., a CID 800a) and said issuing the instruction for the next entry in the ordered list 1008 of identifiers (e.g., the ACID array register 900) in the next clock cycle until all entries in the list have been visited. The instruction issue logic 608 may be configured to repeat said iterating until one or more of the software threads having instructions waiting to issue are terminated.

In an example, if the processing device 600 (e.g., the multithreaded processor 600) terminates a software thread from the software threads having instructions waiting to issue, the instruction issue logic 608 may be configured to remove the corresponding identifier (e.g., a CID 800a) from the ordered list 1008 of identifiers (e.g., the ACID array register 900) and to unbind the terminated software thread from the corresponding available hardware context (e.g., 602a) in a set of hardware contexts (e.g., 602a-602n).

In an example, if the processing device 600 (e.g., the multithreaded processor 600) adds a new software thread to the software threads having instructions waiting to issue, the instruction issue logic 608 may be configured to bind the new software thread to an available hardware context (e.g., 602b) in a set of available hardware contexts (e.g., 602a-602n) and to store an identifier (e.g., a CID 800a) of the available hardware context (e.g., 602b) bound to the new software thread to a next available entry in an ordered list of identifiers 1008 (e.g., the ACID array register 900).

In one example, the multithreaded processor 600 may be provided with instruction validity prediction logic 618. The instruction validity prediction logic 618 may be configured to determine if any dependencies exits between instructions ready to be issued during a clock cycle. The dependency information provided by the instruction validity prediction logic 618 may be encoded and output in the form of "chaining bits" used to determine in advance if a current thread and any additional threads have valid instructions that can be issued in the next clock cycle. In an example, dependencies may be identified by instruction validity prediction logic 618 of the processing device 600 (e.g., the multithreaded processor 600) in view of the values of a chaining bit extracted by instruction validity prediction logic 618 from each of the instructions waiting to issue. The instruction validity prediction logic 618 may be configured to group the instruction associated with the identifier and the other instructions among the instructions waiting to issue into a group of instructions. The instruction validity prediction logic 618 may be configured to encode the designated bit in each instruction with the zero or more dependencies among the group of instructions to produce a sequence of chaining bits.

In an example, to determine whether the instruction associated with the identifier has no dependencies with any other instructions among the instructions waiting to issue may further comprise the instruction validity prediction logic 618 may be configured to extract the designated bit from each instruction of the group of instructions to produce a sequence of chaining bits. The instruction validity prediction logic 618 may be configured to decode the sequence of chaining bits. The instruction validity prediction logic 618 may be configured to identify zero or more instruction dependencies among the group of instructions in view of the decoded sequence of chaining bits. The instruction validity prediction logic 618 may be configured to determine that the instruction associated with the identifier is associated with zero dependencies of the zero or more instruction stream dependencies.

In an example, the sequence of chaining bits may be decoded without decoding any of the instructions in the group of instructions. In an example, an identified dependency between two or more instructions within the group of instructions may be a control dependency or a data dependency. If the instruction validity prediction logic 618 determines that an instruction associated with the identifier (e.g., a CID 800a) has one or more dependencies with any other instructions among the instructions waiting to issue, the processing device 600 (e.g., the multithreaded processor 600) may be configured to issue a no-operation (NOP) for the associated software thread. In another example, the processing device 600 (e.g., the multithreaded processor 600) may register bypass the result directly to the next instruction.

Instruction chaining employs one bit per instruction, referred to hereinafter as the "chaining bit," to indicate both parallelism and inter-instruction dependencies in a sequence of processor instructions. As used herein, an instruction refers to an independently addressable unit with operation and operand phrases (See in Gerrit A. Blaauw and Frederick P. Brooks, Jr., "Computer Architecture: Concepts and Evolution," Addison Wesley, first edition, February 1997, page 128). Multiple instructions may be grouped together to form an instruction group that may be fetched together. At runtime, the processor reassembles the chaining bits from the instructions in an instruction group to decode dependencies and parallelism within the instruction stream efficiently without having to decode the individual instructions. This information may be employed to generate necessary pipeline control signals for instruction issue, eliminating the need for complex inter-instruction dependency checking hardware or NOP instructions in pipelined processor architectures. This procedure may co-exist with pipeline effects that are not visible to programmers such as long load pipeline stalls, branch resolution, and other long latency operations. Since each instruction is independently addressable, jumping into the middle of an instruction group may be permitted. However, when jumping into the middle of the instruction group, the dependency bits for the entire group need to be reconstructed for chaining bit decoding. If a compiler analyzes the instruction dependencies and generates the chaining bits, then a programmer effectively does not see any pipeline effects and can program the machine without regard to hazards.

While it may be possible to define a set of chaining bits to be compatible with different processor implementations, for most implementations, the chaining bits may be implementation dependent: their semantics may be interpreted only on the processor for which they were programmed. In an example, a single-issue pipelined processor may have only two interpretations of one chaining bit. A "0" value denotes no chaining and a "1" value denotes that the instruction may be chained with the next instruction. Thus, in a single-issue pipelined processor, the chaining bit may indicate only whether instructions are independent and with or without hazards. In another example, the logic of the chaining bit may be reversed to interpret a "0" to denote chaining and a "1" to denote no chaining.

Instruction Chaining in a Single-Issue Pipelined Processor

Figure 11:
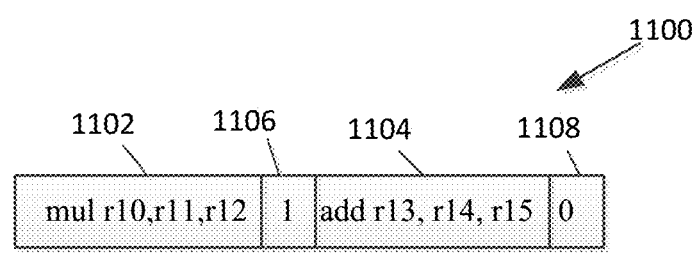
FIG. 11 shows an example of two independent instructions, each of the instructions having a corresponding bit reserved for chaining information.

The simplest case of chaining is a single-issue pipelined processor that can issue one instruction per clock cycle if there are no inter-instruction dependencies. FIG. 11 shows an example 1100 of two independent instructions 1102, 1104, each of the instructions 1102, 1104 having a corresponding bit 1106, 1108, reserved for chaining information. The chaining bit 1106 of the multiply instruction 1102 is set to 1 because the add instruction 1104 is independent and may be executed in parallel. Any number of bits may be chained together based on the capabilities of a particular processor.

In an example, for a typical pipelined-processor, if inter-instruction dependencies exist, the pipeline must stall until the dependencies are resolved. If the chaining bit is set to "1", this is an indication that the next instruction has no control or data dependencies with any instructions within the current instruction chain. Hence, the instruction may be issued immediately. If the chaining bit is set to "0", this is an indication that the next instruction has control and/or data dependencies with at least one instruction within the current instruction chain. Hence, the execution of this instruction cannot commence until all instructions in the current chain complete execution and exit the pipeline.

Instruction Chaining in a Dual-Issue Pipelined Processor

A dual-issue pipelined processor may be configured to issue two instructions (an instruction group) every cycle if there are no instruction dependencies. If there is a dependency between instruction groups, the pipeline is stalled until the dependency is resolved. If there is a dependency within the instruction group, then the instructions within the instruction group are issued serially, i.e., the first instruction is issued and the second instruction is stalled until the first instruction completes execution and exits the pipeline.

Each instruction in the instruction group has a chaining bit. Hence, in a dual-issue processor, there are two chaining bits available per instruction group and thus 4 scenarios can be encoded. In an example, one chaining bit may be used to indicate vertical parallelism (inter-group parallelism) and the second chaining bit may be used to indicate horizontal parallelism (intra-group parallelism).

FIG. 12 shows one example of a set of instruction chaining semantics for a dual-issue pipelined processor. Chaining bits i1 and i2 may be taken from the first and second instructions in the instruction group, respectively. Chaining bit i1 is the intra-group parallelism bit. If the intra-group parallelism bit is 1, then the second instruction in the group can be issued in parallel with the first instruction in the group. If the intra-group parallelism bit is 0, then the second instruction has to wait until the first instruction has completed execution. Chaining bit i2 is the inter-group parallelism bit. If the inter-group parallelism bit is 1, then the next execution group can enter the pipeline in the next clock cycle behind the current executing group. If the inter-group parallelism bit is 0, then the next execution group has to wait until the current execution group has completed execution.

Instruction Chaining in a 3-Issue Pipelined Processor

A 3-issue pipelined processor may issue three instructions (an instruction group) every cycle if there are no instruction dependencies. If there is a dependency between instruction groups, the pipeline is stalled until the dependency is resolved. If there is a dependency within the instruction group, then the instructions within the instruction group are issued serially or partially parallel as indicated by the chaining bits. Each instruction in the instruction group has a single chaining bit. Hence, in a 3-issue processor, there are three chaining bits available per instruction group yielding 8 semantic combinations. One chaining bit may be used to indicate vertical parallelism (across instruction groups) and the other two chaining bits may be used to indicate horizontal parallelism (within the instruction group).

FIG. 13 shows one example of semantics for instruction chaining in a 3-issue processor. The example of semantics for instruction chaining for the chaining bit combinations indicated in FIG. 13 offers the maximum flexibility in horizontal parallelism. A value of x in FIG. 13 indicates the chaining bit can be a 0 or a 1. Chaining bits i1, i2 and i3 may be taken from the first, second and third instructions in the instruction group, respectively. Chaining bits i1 and i2 are the intra-group parallelism bits. If i1 or i2 is 1, then the next instruction in the group can be issued in parallel with the current instruction in the group. If i1 or i2 is 0, then the next instruction has to wait until the currently executing instructions have completed execution. Chaining bit i3 is inter-group parallelism bit. If i3 is 1, then the next execution group can enter the pipeline in the next clock cycle behind the current execution group. If i3 is 0, then the next execution group needs to wait until the current execution group has completed execution.

If full flexibility in horizontal parallelism is not necessary, two chaining bits may be sufficient to encode vertical and horizontal parallelism (all three instructions issued together or not). The third chaining bit may be used to encode additional information.

Instruction Chaining in a 4-Issue Pipelined Processor

A 4-issue pipelined processor issues four instructions every cycle if there are no instruction dependencies. If there is a dependency between instruction groups, the pipeline may be stalled until the dependency is resolved. If there is a dependency within the instruction group, then the instructions within the instruction group may be issued serially or partially parallel as indicated by the chaining bits.

Each instruction in the instruction group has a single chaining bit. Hence, in a 4-issue processor, there are four chaining bits available per instruction group, yielding 16 semantic combinations. One chaining bit may be used to indicate vertical parallelism (across instruction groups) and the other three chaining bits may be used to indicate other possibilities for horizontal execution (executing instructions within instruction group).

FIG. 14 shows one example of a set of instruction chaining semantics for a 4-issue processor. A value of x in FIG. 14 indicates the chaining bit can be a 0 or a 1. Chaining bits i2, i3, i4 may be taken from the first, second, third and fourth instructions in the instruction group, respectively. Chaining bit i4 is an inter-group parallelism bit. If i4 is 1, then the next execution group can enter the pipeline in the next clock cycle behind the current execution group. If i4 is 0, then the next execution group has to wait until the current execution group has completed execution. Chaining bits i1, i2, and i3 may be used to indicate intra-group parallelism. In an example, some combinations of chaining bits i1, i2, and i3 indicate possible parallelism within the instructions in the group (001x, 010x, 011x, 100x) and other combinations indicate mandatory parallelism within instructions in the group (101x, 110x, 111x). Possible parallelism exposes the available parallelism, but the processor may or may not use it. The results remain the same whether the instructions are executed in parallel or sequentially. Mandatory parallelism indicates that the instructions must be executed in parallel to obtain desired results.

By employing chaining, dependencies may be encoded across a sequence of instructions. In the example of FIG. 13, a 3-issue machine may employ three chaining bits (one from each instruction) to encode 8 possible dependency types. In this sense, chaining may be extended to groups of instructions. For example, "000" decoded from the chaining bits of three instructions may be interpreted as all of the instructions within a current group are not chained and the next group of instructions may not be chained with the current group of instructions.

In one example, in a multiple issue processor, one of the chaining bits may be reserved for inter-group parallelism to indicate whether a next group of instructions after a current group of instruction contains any control or data dependencies with the current group of instructions. If there are no dependencies, the next group of instructions may be issued down the pipeline concurrently with the current group of instructions without any pipeline stalls. The other chaining bits within an instruction group may describe intra-group parallelism information that indicates parallelism and dependencies between the instructions in the current instruction group.

Chaining bits may also encode performance improvement techniques, such as informing a processor to use a bypass value rather than reading it again from a register file. In some situations, this may reduce the power dissipated by the processor.

Advantageously, both parallelism and dependencies may be encoded across a group of instructions. Chaining bits may be employed to encode inter-instruction dependencies, inter-group dependencies, and performance optimizations that during execution help to quickly generate the necessary pipeline control signals in a pipelined-processor, thereby eliminating the need for complex dependency checking hardware.

Examples of the present disclosure are concerned with improving single threaded performance in barrel-threaded processors. More specifically, information from chained instructions, as described in the '428 application, may be employed to efficiently determine instructions that may issue without hazard. With this information, instructions may continue to issue from the same software thread to the same hardware context if there are fewer software threads than hardware contexts.

A method and apparatus is described in '428 application whereby a compiler or programmer identifies parallelism and inter-instruction dependencies and encodes this information using a single bit of the instruction format distributed over a number of instructions. This may be referred to as instruction chaining. A processor then reassembles these bits at runtime to determine inter-instruction dependencies and parallelism within the instruction stream. This information is used by the processor to generate the necessary pipeline control signals (as shown in FIGS. 6 and 7 labelled "control" or instruction issue logic 608) to improve execution times or to stall the pipeline to satisfy inter-instruction dependencies without the need for complex dependency checking hardware, long instruction sequences, or complex issue logic.

Other types of performance optimizations such as register bypass information may be encoded into the chained bits.

Those skilled in the art will recognize that any number (e.g., one or more) of software threads waiting to issue instructions can be grouped together and dependencies among the group of threads waiting to issue instructions may be identified by employing chaining bits.

Figure 15:
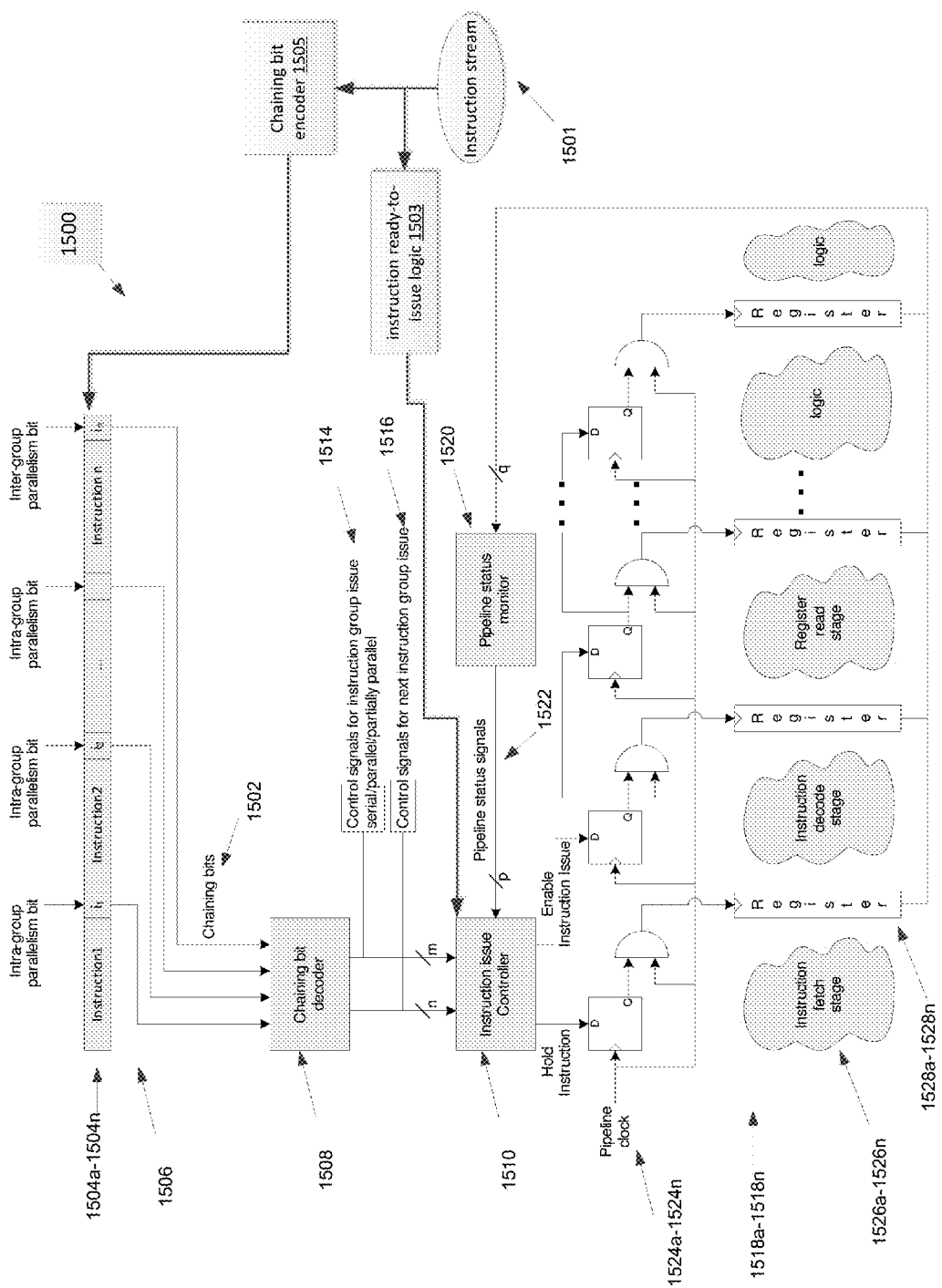
FIG. 15 shows one example of the instruction validity prediction logic to extract chaining bits from instructions in an instruction group, decode the extracted chaining bits, and generate pipeline control signals, in which examples of the present disclosure may operate.

FIG. 15 shows one example of the instruction validity prediction logic 618 to extract chaining bits from instructions in an instruction group, decode the extracted chaining bits, and generate pipeline control signals, in which examples of the present disclosure may operate. The instruction validity prediction logic 618 may comprise instruction ready-to-issue logic 1503, a chaining bit encoder 1505, and a chaining bit decoder 1508. The instruction ready-to-issue logic 1503 may be configured to identify whether each thread of a sequence of software threads has instructions waiting to be issued during a specific clock cycle. The ready-to-issue logic 1503 may be further configured to group the set of instruction waiting to issue into a group of instructions (hereinafter "the instruction group 1506").

The chaining bit encoder 1505 may be configured receive the instruction group 1506 from an instruction stream 1501 identified by the instruction ready-to-issue logic 1503. The chaining bit encoder 1505 may be configured to identify zero or more instruction stream dependencies among the received instruction group 1506. The chaining bit encoder 1505 may be configured to encode a bit in each instruction of the received instruction group 1506 to produce a sequence of chaining bits containing the zero or more encoded instruction stream dependencies among the instruction group 1506.

The chaining bit decoder 1508 may be configured to extract chaining bits 1502 from instructions 1504a-1504n in an instruction group 1506, decode the extracted chaining bits 1502, and generate pipeline control signals for enabling dependency information, parallelism information, and performance optimizations to be decoded without examining the underlying instructions encoded in a sequence of instructions. In FIG. 15, the chaining bit decoder 1508 may be configured to decode the semantics of the encoded chaining bit combinations received from the extracted chaining bits 1502 and may be configured to generate appropriate controls for the instruction issue controller 1510.

In one example, the chaining bit decoder 1508 may be configured to extract a designated bit from each instruction of the group of instructions (e.g., the instructions 1504a-1504n in an instruction group 1506) to produce a sequence of chaining bits 1502. The chaining bit decoder 1508 may decode the sequence of chaining bits 1502. The sequence of chaining bits 1502 may be decoded without decoding any of the instructions in the group of instructions (e.g., the instructions 1504a-1504n in an instruction group 1506). The chaining bit decoder 1508 may identify zero or more instruction dependencies among the group of instructions (e.g., the instructions 1504a-1504n in an instruction group 1506) in view of the decoded sequence of chaining bits 1502. In an example, any identified dependency between two or more instructions within the group of instructions (e.g., the instructions 1504a-1504n in an instruction group 1506) may be a control dependency or a data dependency. The chaining bit decoder 1508 may then determine that one or more instructions in the instruction group 1506 are associated with zero dependencies of the zero or more instruction stream dependencies.

The instruction issue logic 608 may be configured to control the issuance of instructions within an instruction group (serial, parallel, or partially parallel) using the control signals 614. The instruction issue logic 608 may be configured to receive the commands from the chaining bit decoder 1508 and may generate the pipeline control signals to stall instruction issue in pipeline stages 618a-618n (comprising, for example, pipeline clocks 1524a-1524n, pipeline stage logic 1526a-1526n, and corresponding registers 1528a-1528n), if necessary. The pipeline status monitor 620 may be configured to monitor instructions currently executing in the pipeline stage 1518 and provide feedback 1522 to the instruction issue logic 608 to restart instruction issue after a stall. An important consideration in examples of the present disclosure, and unlike VLIW and visible pipeline designs, is that the pipeline controls are generated such that a compiler or a programmer does not see any pipeline effects.

If the instruction validity prediction logic 618 determines that an instruction associated with the identifier (e.g., a CID 800a) has one or more dependencies with any other instructions among the instructions waiting to issue, the instruction issue logic 608 may instruct the processing device 600 (e.g., the multithreaded processor 600) to issue a no-operation (NOP) for the associated software thread. In another example, the processing device 600 (e.g., the multithreaded processor 600) may register bypass the result directly to the next instruction.

Figure 16:
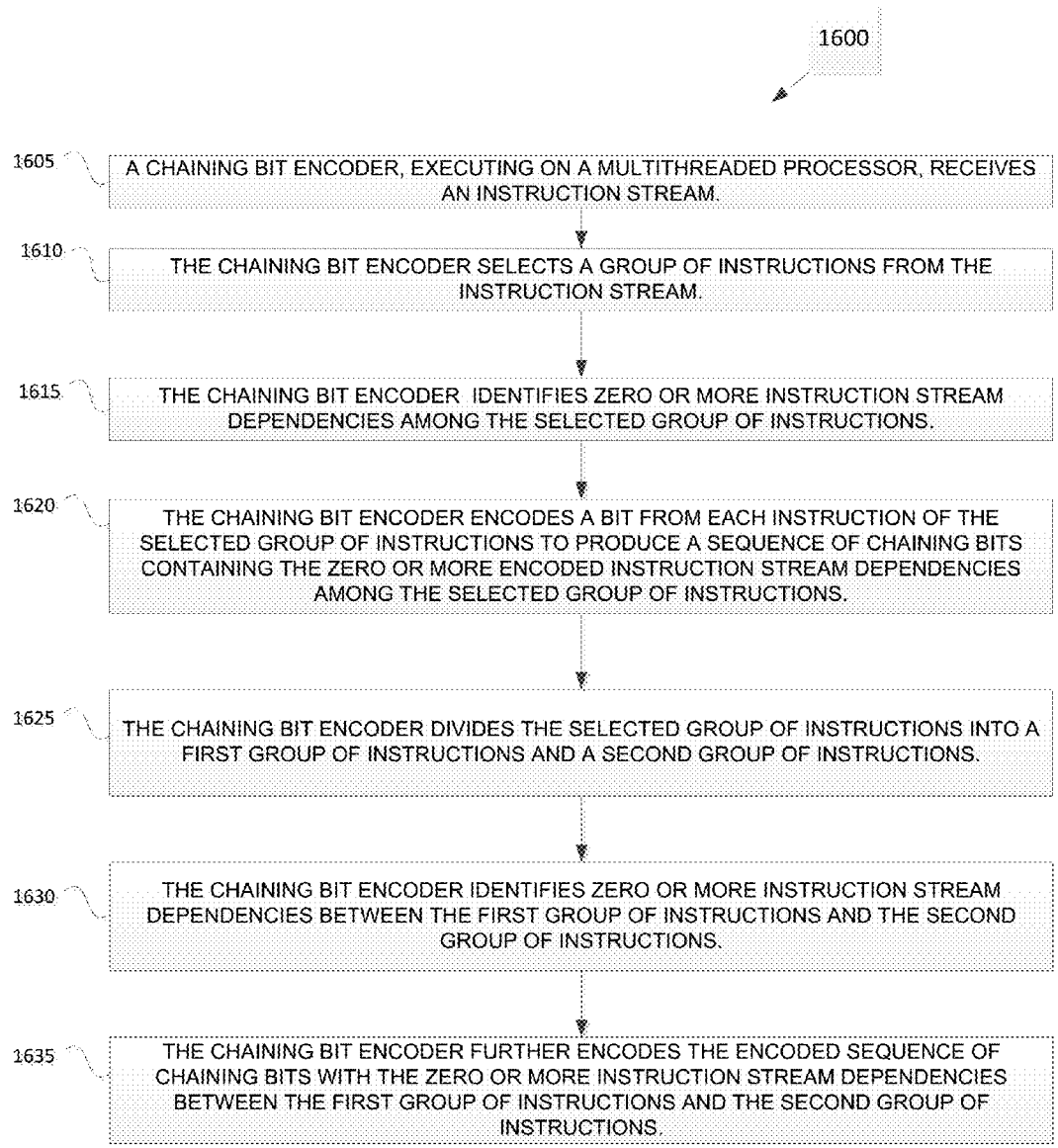
FIG. 16 is a flow diagram illustrating an example of a method for enabling dependency information, parallelism information, and performance optimizations to be encoded in a sequence of instructions.

FIG. 16 is a flow diagram illustrating an example of a method 1600 for enabling dependency information, parallelism information, and performance optimizations to be encoded in a sequence of instructions. The method 1600 may be performed, for example, by chaining bit encoder 1505 of the instruction validity prediction logic 618 of the computer processor of FIGS. 6, 7, and 15 or by other types of computer processors and may comprise hardware (e.g., circuitry, dedicated logic, programmable logic, microcode, etc.), software (e.g., instructions run on a processing device), or a combination thereof. In one example, the method 600 may be performed by the chaining bit encoder 1505 of the instruction validity prediction logic 618 of the computer processor of FIGS. 6, 7, and 15.

As shown in FIG. 16, to permit enabling dependency information, parallelism information, and performance optimizations to be encoded in a sequence of instructions, at block 1605, a chaining bit encoder 1505, executing on the multithreaded processor 600, receives an instruction stream 1501. At block 1610, chaining bit encoder 1505 selects a group of instructions (e.g., the instructions 1504a-1504n in the instruction group 1506) from the instruction stream 1501.

At block 1615, the chaining bit encoder 1505 identifies zero or more instruction stream dependencies among the selected group of instructions (e.g., the instructions 1504a-1504n in the instruction group 1506). At block 1620, the chaining bit encoder 1505 encodes a bit from each instruction of the selected group of instructions (e.g., the instructions 1504a-1504n in the instruction group 1506) to produce a sequence of chaining bits 1502 containing the zero or more encoded instruction stream dependencies among the group of instructions (e.g., the instructions 1504a-1504n in the instruction group 1506).

In one example, the encoded sequence of chaining bits 1502 may indicate that two or more instructions in the selected group of instructions (e.g., the instructions 1504a-1504n in the instruction group 1506) may be executed in parallel. In another example, the encoded sequence of chaining bits 1502 may indicate that two or more instructions in the selected group of instructions (e.g., the instructions 1504a-1504n in the instruction group 1506) must be executed in series. In another example, the encoded sequence of chaining bits 1502 may indicate that two or more instructions in the selected group of instructions (e.g., the instructions 1504a-1504n in the instruction group 1506) must be executed in parallel. In another example, the decoded sequence of chaining bits 1502 may indicate that the selected group of instructions (e.g., the instructions 1504a-1504n in the instruction group 1506) may be executed partially in parallel and partially in series.

In an example, the number of instructions for the chaining bit encoder 1505 to place in the selected group of instructions (e.g., the instructions 1504a-1504n in the instruction group 1506) may be based on the issue width of the processor (e.g., the processor 600) on which the selected group of instructions are to be executed. In an example, the number of instructions for the chaining bit encoder 1505 to place in the selected group of instructions (e.g., the instructions 1504a-1504n in the instruction group 1506) may be further based the number of instructions waiting to issue from software threads when the number of software threads is less than or equal to the number of available hardware contexts (e.g., 602a-602n).

In an example, the chaining bit encoder 1505 may identify a dependency between two or more instructions within the selected group of instructions (e.g., the instructions 1504a-1504n in the instruction group 1506) as a control dependency or a data dependency.

In an example, one or more bits in the encoded sequence of chaining bits 1502 may be operable to optimize performance of an executable program. The encoded sequence of chaining bits 1502 may be operable to function as pipeline control signals.

In one example, at block 1625, the chaining bit encoder 1505 may divide the selected group of instructions into a first group of instructions and a second group of instructions. At block 1630, the chaining bit encoder 1505 may identify zero or more instruction stream dependencies between the first group of instructions and the second group of instructions. At block 1635, the chaining bit encoder 1505 may further encode the encoded sequence of chaining bits with the zero or more instruction stream dependencies between the first group of instructions and the second group of instructions. In an example, a bit in the encoded sequence of chaining bits may indicate that the first group of instructions may be executed in parallel with the second group of instructions.

Figure 17:
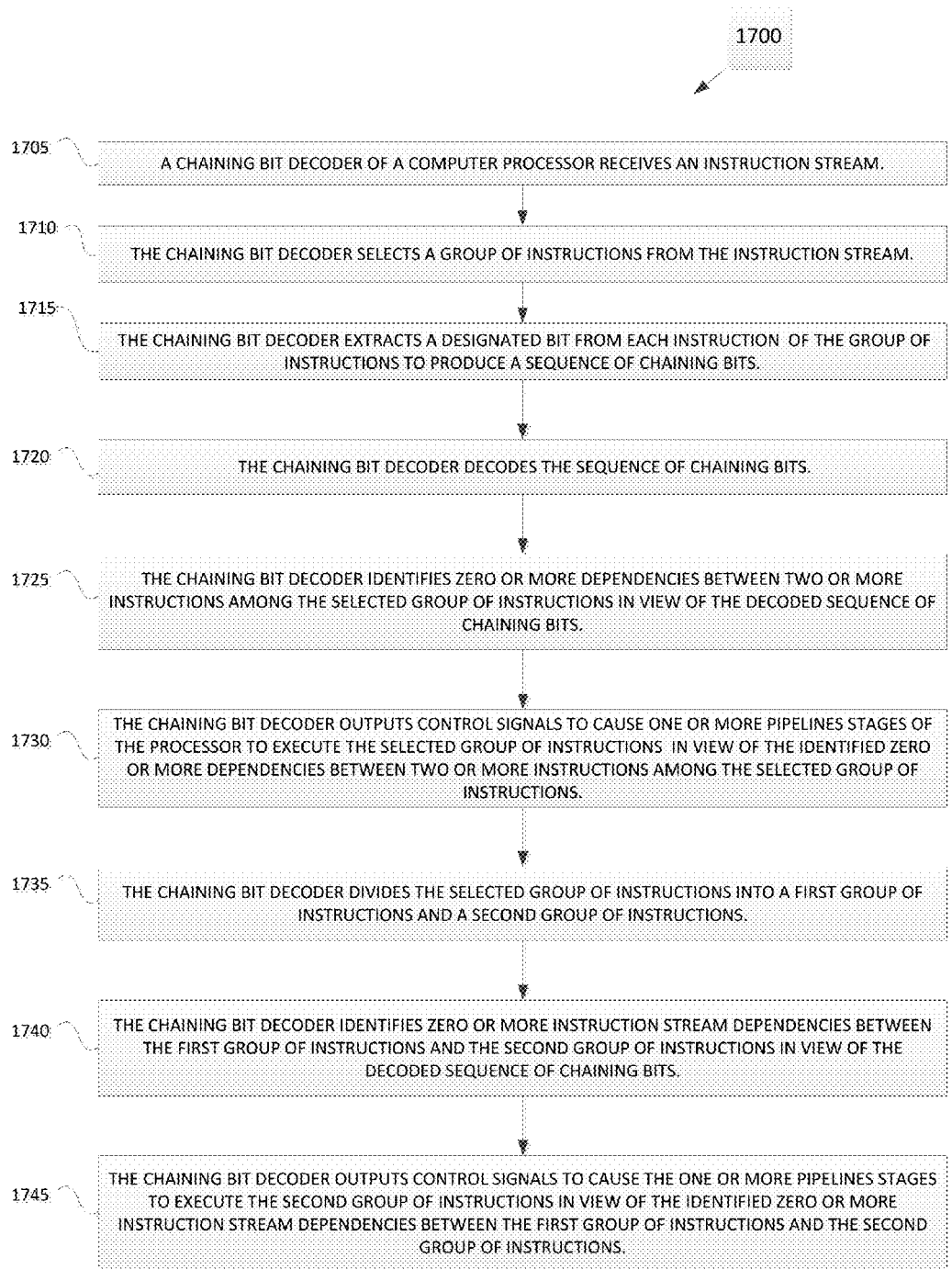
FIG. 17 is a flow diagram illustrating an example of a method for enabling dependency information, parallelism information, and performance optimizations to be decoded without examining the underlying instructions encoded in a sequence of instructions.

FIG. 17 is a flow diagram illustrating an example of a method 1700 for enabling dependency information, parallelism information, and performance optimizations to be decoded without examining the underlying instructions encoded in a sequence of instructions. The method 1700 may be performed by the multithreaded processor 600 of FIGS. 6, 7, and 15 and, in one example, may be performed primarily by the chaining bit decoder 1508 of the instruction validity prediction logic 618 (e.g., circuitry, dedicated logic, programmable logic, microcode, etc.) of FIGS. 6, 7, and 15.

As shown in FIG. 17, at block 1705, the chaining bit decoder 1508 of the multithreaded processor 600 receives an instruction stream. At block 1710, the chaining bit decoder 1508 selects a group of instructions from the instruction stream (e.g., the instructions 1504a-1504n in an instruction group 1506). At block 1715, the chaining bit decoder 1508 extracts a designated bit 1502 from each instruction (e.g., 1504a-1504n) of the instruction stream to produce a sequence of chaining bits 1502. At block 1720, the chaining bit decoder 1508 decodes the sequence of chaining bits 1502. At block 1725, the chaining bit decoder 1508 identifies zero or more dependencies between two or more instructions among the selected group of instructions (e.g., the instructions 1504a-1504n in an instruction group 1506) in view of the decoded sequence of chaining bits 1502. In an example, an identified dependency between two or more instructions among the selected group of instructions 1504a-1504n may be a control dependency or a data dependency.

At block 1730, the chaining bit decoder 1508 outputs control signals (e.g., to the instruction issue controller 1510) to cause the one or more pipelines stages 1518 to execute the selected group of instructions (e.g., the instructions 1504a-1504n in an instruction group 1506) in view of the identified zero or more dependencies between two or more instructions among the selected group of instructions (e.g., the instructions 1504a-1504n in an instruction group 1506). The sequence of chaining bits 1502 may be decoded by the chaining bit decoder 1508 without decoding any of the instructions in the selected group of instructions (e.g., the instructions 1504a-1504n in an instruction group 1506).

In an example, the remaining bits in the decoded sequence of chaining bits 1502 may indicate to the instruction issue controller 1510 that two or more instructions in the selected group of instructions 1504a-1504n may be executed in parallel by the pipelines stages 1518. In another example, the remaining bits in the decoded sequence of chaining bits 1502 may indicate to the instruction issue controller 1510 that two or more instructions in the selected group of instructions 1504a-1504n may be executed in series by the pipelines stages 1518. In another example, the remaining bits in the decode sequence of chaining bits 1502 may indicate to the instruction issue controller 1510 that two or more instructions in the selected group of instructions 1504a-1504n must be executed in parallel by the pipelines stages 1518. In another example, the remaining bits in the decoded sequence of chaining bits 1502 may indicate to the instruction issue controller 1510 that the selected group of instructions may be executed partially in parallel and partially in series by the pipelines stages 1518.

In an example, the number of instructions to place in the selected group of instructions 1504a-1504n may be based on an issue width of the multithreaded processor 600. In an example, the number of instructions for the chaining bit encoder 1505 to place in the selected group of instructions (e.g., the instructions 1504a-1504n in the instruction group 1506) may be further based the number of instructions waiting to issue from software threads when the number of software threads is less than or equal to the number of available hardware contexts (e.g., 602a-602n).

In an examples, the chaining bit decoder 1508 may be configured to identify intra-group dependencies within the selected group of instruction using the chaining bits 1502. Accordingly, at block 1735, the chaining bit decoder 1508 may divide the selected group of instructions 1504a-1504n and associated chaining bits 1502 into a first group of instructions and a second group of instruction in order to identify intra-group dependencies (e.g., between groups).

At block 1740, the chaining bit decoder 1508 may identify zero or more dependencies between an instruction of the first group of instructions and an instruction of a second group of instructions selected from the instruction stream based on the decoded sequence of chaining bits 1502. At block 1745, the chaining bit decoder 1508 may output control signals (e.g., to the instruction issue controller 1510) to cause the one or more pipelines stages 1518 to execute the second group of instructions based on the identified zero or more dependencies between the instruction of the first group of instructions and the instruction of a second group of instructions. In an example, a bit in the decoded sequence of chaining bits 1502 may indicate that the first group of instructions may be executed in parallel with the second group of instructions. An identified dependency between one or more instructions of the first group of instructions and one or more instructions of the second group of instructions may be control dependencies or data dependencies.

In an example, one or more bits in a decoded sequence of chaining bits 1502 may be operable to optimize performance of the multithreaded processor 600. In an example, the decoded sequence of chaining bits 1502 may be operable to function as pipeline control signals for the pipelines stages 1518.

Figure 18:
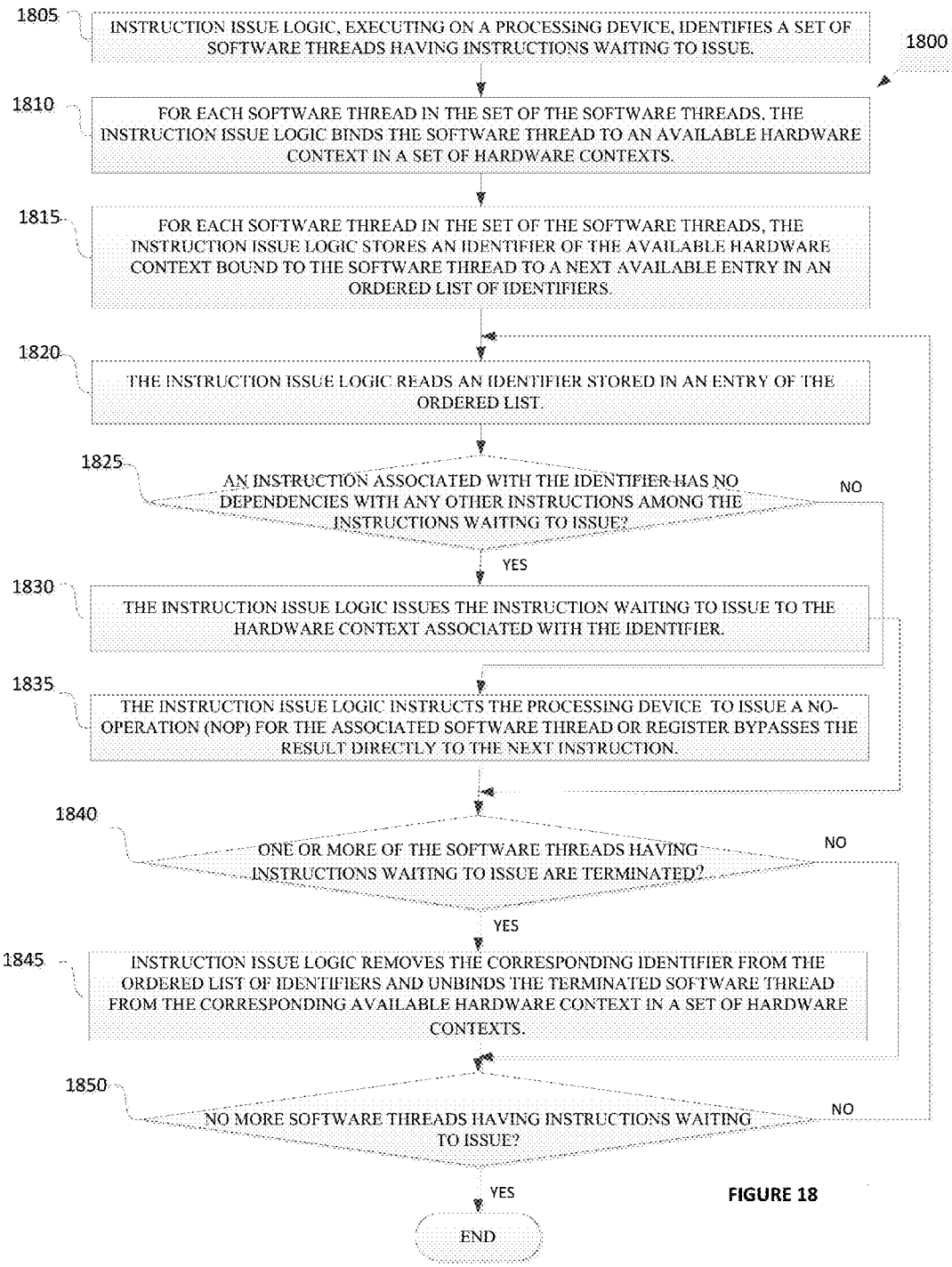
FIG. 18 is a flow diagram illustrating an example of a method for minimizing unused dock cycles in the multi-threaded processor when there are fewer software threads than hardware thread units.

FIG. 18 is a flow diagram illustrating an example of a method 1800 for minimizing unused clock cycles in the multithreaded processor when there are fewer software threads than hardware thread units (e.g., 602a-602n). The method 1800 may be performed, for example, by the (e.g., multithreaded) computer processor 600 of FIGS. 6 and 7, and may comprise hardware (e.g., circuitry, dedicated logic, programmable logic, microcode, etc.), software (e.g., instructions run on a processing device), or a combination thereof. In one example, the method 1800 may be performed by the instruction issue logic 608 of the (e.g., multithreaded) computer processor 600 of FIGS. 6 and 7.

As shown in FIG. 18, to minimizing unused clock cycles in the multithreaded processor 100 when there are fewer software threads than hardware thread units, at block 1805, the instruction issue logic 608, executing on the multithreaded processor 600 (e.g., a processing device 600), may identify a set of software threads having instructions waiting to issue. At block 1810, for each software thread in the set of the software threads, the instruction issue logic 608 may bind the software thread to an available hardware context (e.g., 602a) in a set of hardware contexts (e.g., 602a-602n). At block 1815, for each software thread in the set of the software threads, the instruction issue logic 608 may store an identifier (e.g., a context identifier (CID) (e.g., 800a) of the available hardware context (e.g., 602a) bound to the software thread to a next available entry in an ordered list 1008 of identifiers (e.g., the ACID array register 900). At block 1820, the instruction issue logic 608 may read an identifier (e.g., a CID 800a) stored in an entry of the ordered list 1008 (e.g., the ACID array register 900). If, at block 1825, an instruction associated with the identifier (e.g., a CID 800a) has no dependencies with any other instructions among the instructions waiting to issue, then at block 1830, the instruction issue logic 608 may issue the instruction waiting to issue to the hardware context (e.g., 602a) associated with the identifier (e.g., a CID 800a).

If, at block 1825, the instruction issue logic 608 determines that an instruction associated with the identifier (e.g., a CID 800a) has one or more dependencies with any other instructions among the instructions waiting to issue, then at block 1835, the instruction issue logic 608 may instruct the processing device 600 (e.g., the multithreaded processor 600) to issue a no-operation (NOP) for the associated software thread. In another example, the processing device 600 (e.g., the multithreaded processor 600) may register bypass the result directly to the next instruction. The instruction issue logic 608 may repeat said iterating until, one or more of the software threads having instructions waiting to issue are terminated.

In an example, if, at block 1840, the processing device 600 (e.g., the multithreaded processor 600) terminates a software thread from the software threads having instructions waiting to issue, then at block 1845, the instruction issue logic 608 may remove the corresponding identifier (e.g., a CID 800a) from the ordered list of identifiers 1008 (e.g., the ACID array register 900) and unbind the terminated software thread from the corresponding available hardware context (e.g., 602a) in a set of hardware contexts (e.g., 602a-602n).

In an example, if the processing device 600 (e.g., the multithreaded processor 600) adds a new software thread to the software threads having instructions waiting to issue, the instruction issue logic 608 may bind the new software thread to an available hardware context (e.g., 602b) in a set of available hardware contexts (e.g., 602a-602n) and store an identifier (e.g., a CID 800a) of the available hardware context (e.g., 602b) bound to the new software thread to a next available entry in an ordered list 1008 of identifiers (e.g., the ACID array register 900).

If, at block 1850, there are no more software threads having instructions waiting to issue, then execution terminates. If, at block 1850, there are more entries in the ordered list of identifiers 1008 (e.g., the ACID array register 900), the instruction issue logic 608 may iterate said reading an identifier (e.g., a CID 800a) and said issuing the instruction for the next entry in the ordered list of identifiers 1008 (e.g., the ACID array register 900) in the next clock cycle until all entries in the list have been visited.

Figure 1:
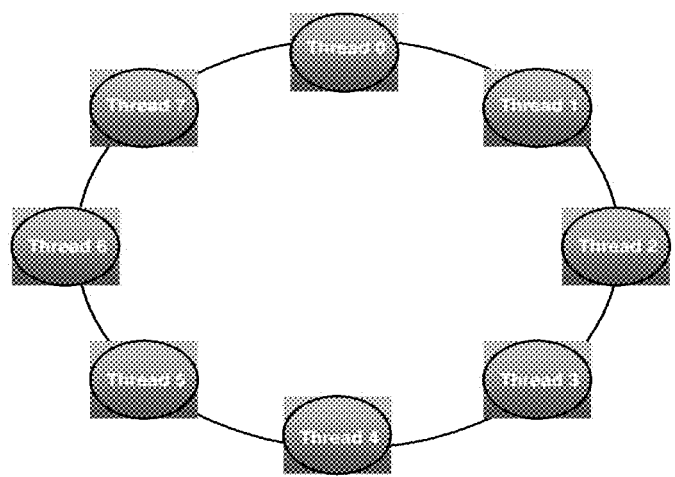
FIG. 1 shows an example of a barrel multithreading execution sequence.
Figure 2:
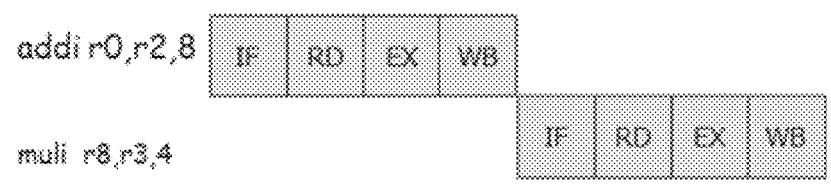
FIG. 2 shows an example of execution of two instructions in a non-pipelined processor.
Figure 19:
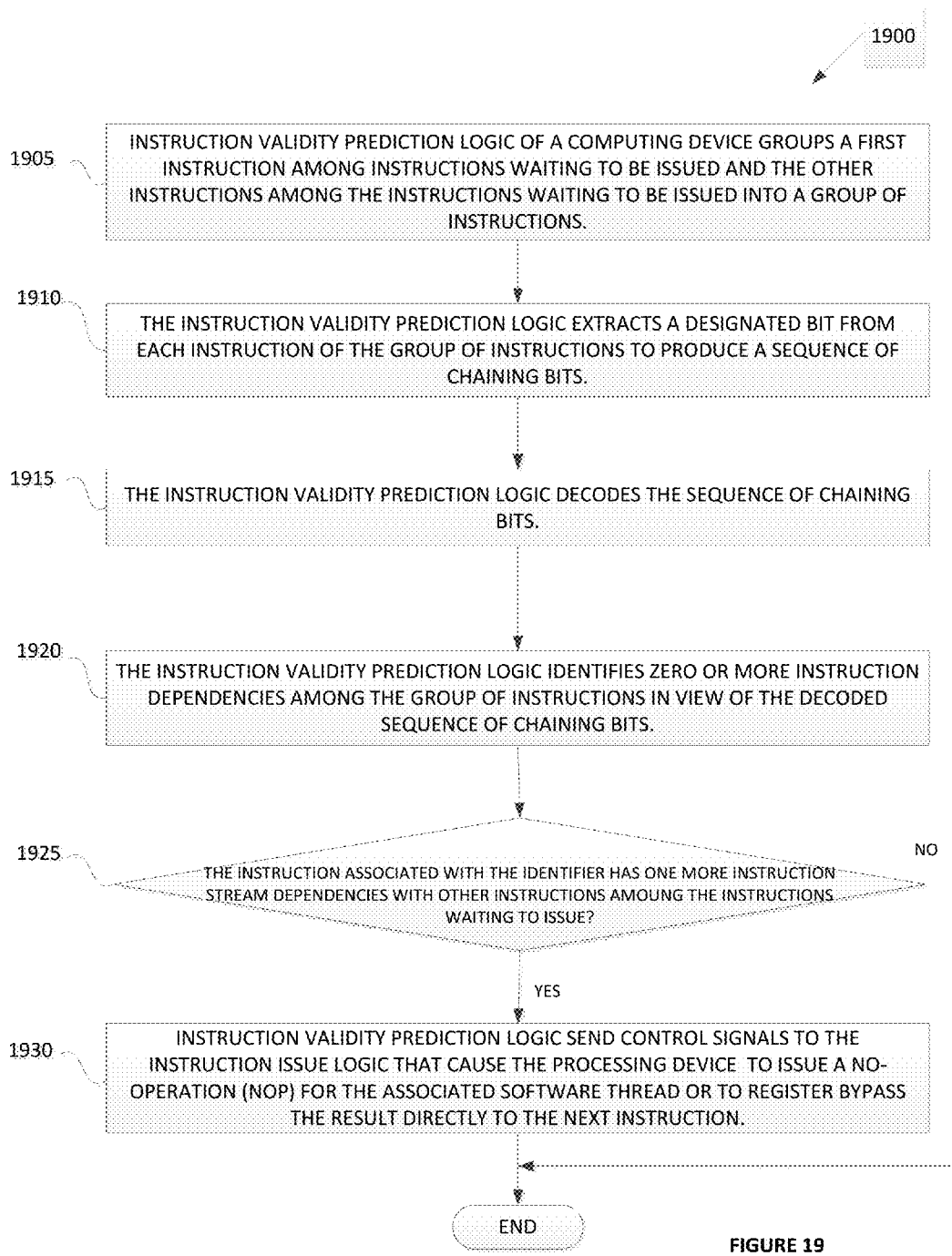
FIG. 19 is a flow diagram illustrating an example of a method for determining whether an instruction associated with the identifier has no dependencies with any other instructions among the instructions waiting to issue.

FIG. 19 is a flow diagram illustrating an example of a method 1900 for determining whether an instruction associated with the identifier has no dependencies with any other instructions among the instructions waiting to issue (block 1825 of FIG. 18). The method 1900 may be performed, for example, by the (e.g., multithreaded) computer processor 600 of FIGS. 1 and 6, and may comprise hardware (e.g., circuitry, dedicated logic, programmable logic, microcode, etc.), software (e.g., instructions run on a processing device), or a combination thereof. In one example, the method 1000 may be performed by the instruction validity prediction logic 618 of the (e.g., multithreaded) computer processor 100 of FIGS. 1 and 6.

As shown in FIG. 19, at block 1905, instruction validity prediction logic 618 executing on the multithreaded processor 600 (e.g., a processing device 600), may group the first instruction and the other instructions among the instructions waiting to issue into a group of instructions (e.g., the instructions 1504a-1504n in an instruction group 1506). At block 1910, the instruction validity prediction logic 618 may extract a designated bit from each instruction of the group of instructions (e.g., the instructions 1504a-1504n in an instruction group 1506) to produce a sequence of chaining bits 1502. At block 1915, the instruction validity prediction logic 618 may decode the sequence of chaining bits 1502. The sequence of chaining bits 1502 may be decoded without decoding any of the instructions in the group of instructions. At block 1920, the instruction validity prediction logic 618 may identify zero or more instruction dependencies among the group of instructions (e.g., the instructions 1504a-1504n in an instruction group 1506) in view of the decoded sequence of chaining bits 1502. In an example, any identified dependency between two or more instructions within the group of instructions may be a control dependency or a data dependency. At block 1925, the instruction validity prediction logic 618 may determine whether the instruction associated with the identifier (e.g., a CID 800a) is associated with zero dependencies of the zero or more instruction stream dependencies. If, at block 1925, the instruction associated with the identifier (e.g., a CID 800a) is associated with zero dependencies of the zero or more instruction stream dependencies, then processing terminates.

In an example, the sequence of chaining bits may be decoded without decoding any of the instructions in the group of instructions. In an example, an identified dependency between two or more instructions within the group of instructions may be a control dependency or a data dependency. If, at block 1925, the instruction validity prediction logic 618 determines that an instruction associated with the identifier (e.g., a CID 800*a*) has one or more dependencies with any other instructions among the instructions waiting to issue, then at block 1930, the instruction validity prediction logic 618 transmits control signals to the instruction issue logic 608 that cause the processing device 600 (e.g., the multithreaded processor 600) to issue a no-operation (NOP) for the associated software thread. In another example, the processing device 600 (e.g., the multithreaded processor 600) may register bypass the result directly to the next instruction.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    identifying, by the processing device, a set of software threads having instructions waiting to issue;
    for each software thread in the set of the software threads,
        binding, by the processing device, the software thread to an available hardware context in a set of hardware contexts; and
        storing, by the processing device, an identifier of the available hardware context bound to the software thread to a next available entry in an ordered list;
    reading, by the processing device, an identifier stored in an entry of the ordered list;
    responsive to an instruction associated with the identifier having no dependencies with any other instructions among the instructions waiting to issue,
        issuing, by the processing device, the instruction waiting to issue to the hardware context associated with the identifier.

2. The method of claim 1, further comprising iterating said reading an identifier and said issuing the instruction for the next entry in the ordered list in the next clock cycle until all entries in the ordered list have been visited.

3. The method of claim 2, further comprising repeating said iterating until one or more of the software threads having instructions waiting to issue are terminated.

4. The method of claim 1, further comprising
    responsive to terminating a software thread from the software threads having instructions waiting to issue,
        removing, by the processing device, the corresponding identifier from the ordered list; and
        unbinding, by the processing device, the terminated software thread from the corresponding available hardware context in a set of hardware contexts.

5. The method of claim 1, further comprising
    responsive to adding a new software thread to the software threads comprising instructions waiting to issue,
        binding, by the processing device, the new software thread to an available hardware context in a set of hardware contexts; and
        storing, by the processing device, an identifier of the available hardware context bound to the new software thread to a next available entry in an ordered list.

6. The method of claim 1, wherein responsive to an instruction associated with the identifier having one or more dependencies with any other instructions among the instructions waiting to issue,
    issuing, by the processing device, a no-operation for the associated software thread or register bypass the result directly to the next instruction.

7. The method of claim 1, wherein the ordered list is an array of bits and the identifier stored in the ordered list is a bit set corresponding to a context number in the set of hardware contexts.

8. The method of claim 1, wherein the ordered list is an array of labels and the identifier stored in the ordered list is a label corresponding to a context number in the set of hardware contexts.

9. The method of claim 8, wherein each of the labels in the ordered list is non-repeating.

10. The method of claim 1, wherein the ordered list is a linked-list of labels and the identifier stored in the ordered list is a label corresponding to a context number in the set of hardware contexts.

11. The method of claim 1, wherein the dependencies are identified in view of values of a chaining bit extracted from each of the instructions waiting to issue.

12. The method of claim 1, wherein determining that the instruction associated with the identifier has no dependencies with any other instructions among the instructions waiting to issue comprises:
    grouping, by the processing device, the instruction associated with the identifier and the other instructions among the instructions waiting to issue into a group of instructions;
    extracting, by the processing device, a designated bit from each instruction of the group of instructions to produce a sequence of chaining bits;
    decoding, by the processing device, the sequence of chaining bits;
    identifying, by the processing device, zero or more instruction dependencies among the group of instructions in view of the decoded sequence of chaining bits; and
    determining, by the processing device, that the instruction associated with the identifier is associated with zero dependencies of the zero or more instruction stream dependencies.

13. The method of claim 12, wherein the sequence of chaining bits is decoded without decoding any of the instructions in the group of instructions.

14. The method of claim 12, wherein an identified dependency between two or more instructions within the group of instructions is a control dependency or a data dependency.

15. The method of claim 12, further comprising encoding, by the processing device, the designated bit in each instruction with the zero or more dependencies among the group of instructions to produce a sequence of chaining bits.

16. The method of claim 1, wherein a number of software threads in the set of software threads is fewer than a number of hardware contexts in the set of hardware contexts.

17. A processing device, comprising:
    a memory;
    a plurality of hardware thread units coupled to the memory;

an instruction issue logic of the processing device, operatively coupled to the memory, the instruction issue logic to:
   identify a set of software threads having instructions waiting to issue;
   for each software thread in the set of the software threads,
     bind the software thread to an available hardware context in a set of hardware contexts; and
     store an identifier of the available hardware context bound to the software thread to a next available entry in an ordered list;
   read an identifier stored in an entry of the ordered list;
   responsive to an instruction associated with the identifier having no dependencies with any other instructions among the instructions waiting to issue,
     issue the instruction waiting to issue to the hardware context associated with the identifier.

18. The system of claim 17, further comprising the instruction issue logic iterating said reading an identifier and said issuing the instruction for the next entry in the ordered list in the next clock cycle until all entries in the list have been visited.

19. The system of claim 17, further instruction issue logic comprising repeating said iterating until one or more of the software threads having instructions waiting to issue are terminated.

20. The system of claim 17, wherein the ordered list is an array of bits stored in a register and the identifier stored in the ordered list is a bit set corresponding to a context number in the set of hardware contexts.

21. The system of claim 17, wherein the ordered list is an array of labels stored in a register and the identifier stored in the ordered list is a label corresponding to a context number in the set of hardware contexts.

22. The method of claim 17, wherein the dependencies are identified in view of values of a chaining bit extracted from each of the instructions waiting to issue.

23. The system of claim 17, further comprising instruction validity prediction logic of the processing device, operatively coupled to the memory, wherein to determine that the instruction associated with the identifier has no dependencies with any other instructions among the instructions waiting to issue, the instruction validity prediction logic is to:
   group the instruction associated with the identifier and the other instructions among the instructions waiting to issue into a group of instructions;
   extract a designated bit from each instruction of the group of instructions to produce a sequence of chaining bits;
   decode the sequence of chaining bits;
   identify zero or more instruction dependencies among the group of instructions in view of the decoded sequence of chaining bits; and
   determine that the instruction associated with the identifier is associated with zero dependencies of the zero or more instruction stream dependencies.

24. The system of claim 17, wherein the ordered list is a linked-list of labels stored in the memory and the identifier stored in the ordered list is a label corresponding to a context number in the set of hardware contexts.

* * * * *